United States Patent [19]

Phillips

[11] Patent Number: 4,922,803
[45] Date of Patent: May 8, 1990

[54] FOUR-WAY VALVE
[75] Inventor: Edward H. Phillips, Middletown, Calif.
[73] Assignee: Techco Corporation, New York, N.Y.
[21] Appl. No.: 324,903
[22] Filed: Mar. 17, 1989
[51] Int. Cl.[5] .......................... F15B 9/08; F16K 11/06
[52] U.S. Cl. .............................. 91/375 R; 137/625.21; 137/625.23
[58] Field of Search ...................... 137/625.21, 625.22, 137/625.23; 91/375 R, 375 A

[56] References Cited
U.S. PATENT DOCUMENTS

| 4,208,951 | 6/1980 | Bacardit . | |
|---|---|---|---|
| 4,217,932 | 8/1980 | Bacardit . | |
| 4,300,594 | 11/1981 | Bacardit . | |
| 4,310,024 | 1/1982 | Bacardit . | |
| 4,320,780 | 4/1982 | Bacardit . | |
| 4,452,274 | 6/1984 | Haga | 91/375 A |
| 4,459,897 | 7/1984 | Bacardit . | |
| 4,461,321 | 7/1984 | Bacardit . | |
| 4,465,098 | 8/1984 | Bacardit . | |
| 4,503,753 | 4/1985 | Bacardit . | |
| 4,512,238 | 3/1985 | Bacardit . | |
| 4,565,115 | 1/1986 | Bacardit . | |
| 4,582,086 | 3/1986 | Bacardit . | |
| 4,594,936 | 6/1986 | Bacardit . | |
| 4,598,629 | 7/1986 | Bacardit . | |
| 4,660,459 | 3/1987 | Bacardit et al. . | |
| 4,665,797 | 5/1987 | Bacardit . | |
| 4,665,798 | 5/1987 | Bacardit . | |
| 4,672,884 | 6/1987 | Rosell et al. . | |
| 4,765,369 | 8/1988 | Bacardit . | |

Primary Examiner—Alan Cohan
Attorney, Agent, or Firm—Harness, Dickey & Pierce

[57] ABSTRACT

A valve for controlling a double-acting utilization device includes inner and outer valve members where the outer valve member has pressure slots with first and second lateral edges, respectively, and the inner valve member includes first and second lands with third and fourth lateral edges, respectively. The first and third lateral edges form input orifices and second and fourth lateral edges form return orifices. The effective radial positions of the input and return orifices are chosen to generate reaction torque within the valve itself. Drive torque and position are applied to the outer valve member and feedback torque and position are communicated to the inner valve member via a torsion bar which is coupled to an output member of the double-acting utilization device.

26 Claims, 24 Drawing Sheets

FOUR-WAY VALVE

TECHNICAL FIELD

This invention relates generally to hydraulic control valves and particularly to rotary four-way open-center control valves which utilize constant flow rate hydraulic power sources.

BACKGROUND AND SUMMARY OF THE INVENTION

Four-way open-center rotary control valves which use constant flow rate hydraulic power sources are commonly utilized for controlling vehicular power steering systems. Such systems typically employ a four-way open-center rotary control valve (hereinafter "rotary valve") having position feedback. Road feel is artificially induced by deflection of a torsion bar.

An earlier type of power steering system provided feedback partially proportional to actual steering effort. This power steering system featured a four-way open-center hydraulic reaction control spool valve (hereinafter "reaction valve"). However, such systems were rather complex to manufacture and were replaced by power steering systems which feature the simpler rotary valves mentioned above.

A rotary valve is a four-way open-center flow control valve which has circumferentially close fitting inner and outer valve members. The inner and outer valve members usually feature four sets each of pressure, first and second output, and return slots. These four sets of slots are equally spaced (at 90 degrees) around the interfacing circumferences of the inner and outer valve members. Differentially controlled output flows and/or pressures in the first and second output slots are obtained by rotationally displacing the inner valve member with respect to the outer valve member.

The open-center configuration of the rotary valve allows a nominally constant flow hydraulic fluid source to be utilized. In normal operation at other than small valve displacements, system supply pressure nominally approximates differential output pressure (hereinafter "output pressure"). This results in minimum system power consumption but results in wildly erratic system control characteristics wherein assist levels can vary by more than 40:1.

The advantages of the present invention can best be appreciated with reference to a thorough understanding of both the rotary valve and the reaction valve mentioned above. They will both be discussed in detail hereinbelow in a section entitled Detailed Description of the Existing Art.

In accordance with the present invention, a four-way open-center rotary control valve having internally generated hydraulic reaction torque (hereinafter "torque reaction valve") is provided. In preferred embodiments of the present invention, the hydraulic reaction torque is generated between inner and outer valve members which are formed with multiple control orifices having differing radii. The control orifices comprises input control orifices which meter fluid from a constant flow hydraulic fluid source into either of first and second output ports, and return control orifices which meter fluid returned therefrom to a tank.

The input control orifices are formed at smaller radii than the return control orifices. Thus, output pressure between the first and second output ports is additively applied to either side of each of a plurality of effectively enlarged ridge sections which form the return control orifices. The product of the output pressure, the summed areas of the enlarged ridge sections, and their effective radii generates the hydraulic reaction torque.

Output pressure is coupled to a utilization device, such as a power cylinder, via flow restrictors. The flow restrictors are controlled orifice devices which can have a nominally linear flow resistance characteristic. For this reason, values of differential pressure applied to the utilization device are less than the output pressure. The reduction of output pressure is nominally proportional to fluid flow rate through the utilization device. This results in a controlled damping ratio and stable operation of systems incorporating the flow restrictors of the present invention.

Improved performance can be obtained from a servo system comprising the torque reaction valve by introducing an orifice in parallel with a double acting utilization device also comprised within the servo system. Fluid flow rate through the orifice improves system damping and results in an improved control characteristic wherein over-sensitive response to small involuntary control inputs are precluded.

BRIEF DESCRIPTION OF THE DRAWINGS

FIGS. 4A and 4B are developed views of slots and control orifices of half of the rotary valve of FIG. 1 shown in centered and offset positions, respectively.

DETAILED DESCRIPTION OF THE EXISTING ART

Figure 1:
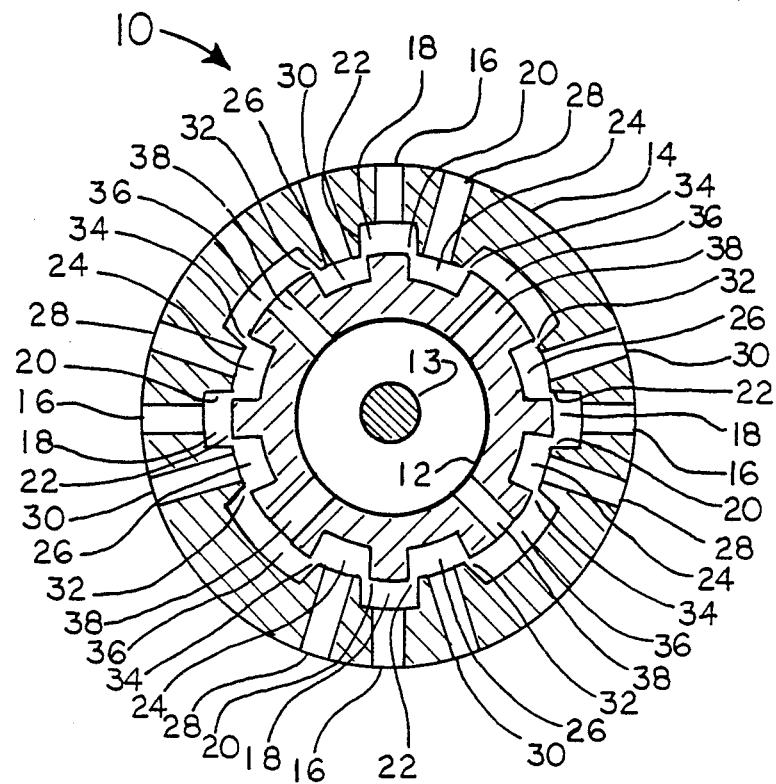
FIG. 1 is a diametrical section view of a rotary valve such as those typically found in vehicular power steering systems.

Shown in FIG. 1 is a diametrical section view of a rotary valve 10 similar to those typically found in vehicular power steering systems. The rotary valve 10 comprises an inner valve member 12 and an outer valve member 14 which are resiliently coupled together by a torsion bar 13.

As normally utilized in a vehicular power steering system, a steering wheel (not shown) drives the inner valve member 12 via a steering column (not shown) while the outer valve member is coupled to a pinion (not shown) of a "rack-and-pinion" gear set (not shown). Differential output pressure and fluid flow from the rotary valve 10 is applied to either side of a double acting utilization device (i.e., a double acting cylinder—not shown) which is coupled to the rack. A control feedback path is provided via meshed engagement of the pinion to the rack and concomitant motion of the outer valve member 14. The torque applied to the steering wheel is linearly related to the rotational displacement of the inner valve member 12 with respect to the outer valve member 14 via the torsional spring constant of the torsion bar 13.

Fluid from a nominally constant flow hydraulic fluid source (not shown) flows into the rotary valve 10 via four inlet ports 16 and into four pressure slots 18. The fluid then flows past either or both sets of first and second sets of input control orifices 20 and 22, respectively, to four sets of first and second output slots 24 and 26, respectively. A selected portion of the fluid flows out one of first or second output ports 28 and 30, respectively, to the double acting utilization device and returns therefrom via the other one of the first or second output ports 28 and 30, respectively. The fluid then flows past either or both sets of first and second return control orifices 32 and 34, respectively, into four return slots 36. The fluid is then returned to a tank (not shown) of the nominally constant flow hydraulic fluid source via four return ports 38 and an internal drain path (also not shown).

Figure 2:
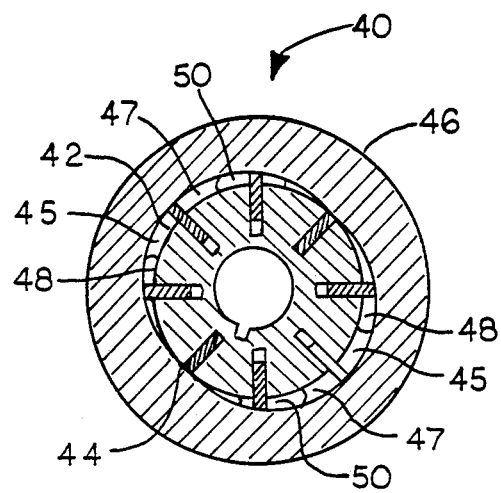
FIG. 2 is a sectional view of a constant displacement pump typically utilized in vehicular power steering systems.

Shown in FIG. 2 is a sectional view of a constant displacement pump 40 similar to those typically found in vehicular power steering systems. The constant displacement pump 40 is a balanced vane pump comprising a rotor 42, vanes 44 and cam ring 46. In operation, the rotor 42 is driven rotationally by a belt and pulley arrangement from the vehicle's engine (not shown). This forces the vanes 44 against the cam ring 46 via centrifugal force. Atmospheric pressure forces fluid into spaces 45 between the vanes 44 via inlet ports 48 as the vanes 44 pass thereby. This is followed by the fluid being forced from spaces 47 between the vanes 44 via discharge ports 50 as the vanes 44 pass thereby.

Figure 3:
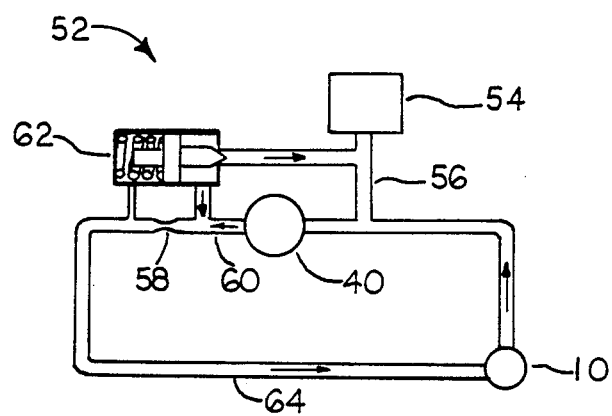
FIG. 3 is a diagramatic drawing of a flow control sub-system commonly used for maintaining nominally constant fluid flow rate.

Shown in FIG. 3 is a digramatic drawing of a flow control sub-system 52 which is commonly used for maintaining nominally constant fluid flow rate. Such sub-systems are typically utilized in vehicular power steering systems because the constant displacement pump 40 is normally coupled to the engine—which operates at variable speeds. This variable speed operation renders the constant displacement pump 40 a variable delivery rate pump in effect—thus creating a requirement for the flow control sub-system 52.

Atmospheric pressure forces fluid from a tank 54 to the constant displacement pump 40 via suction line 56. Fluid is delivered by the constant displacement pump 40 to a flow control orifice 58 via an intermediate flow line 60. Differential pressure generated by fluid flow through the flow control orifice 58 is balanced across a flow control valve 62 which returns excess fluid to the suction line 56. Fluid is delivered at a controlled flow rate to the rotary valve 10 via a delivery line 64.

Figure 4A:
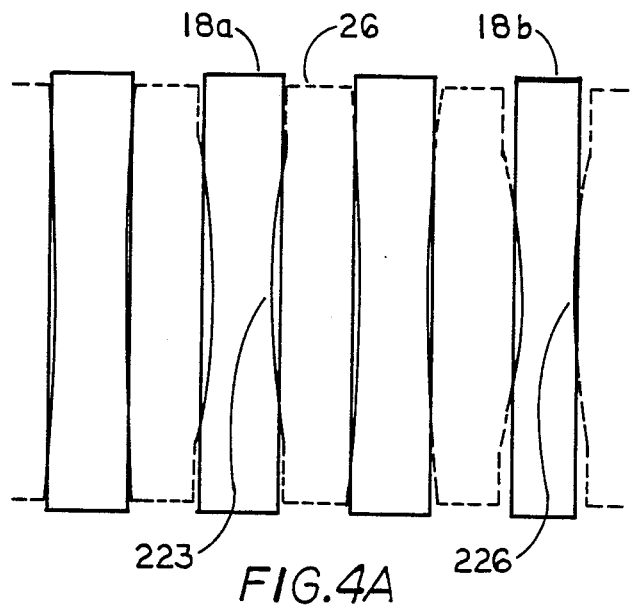
Figure 4A:
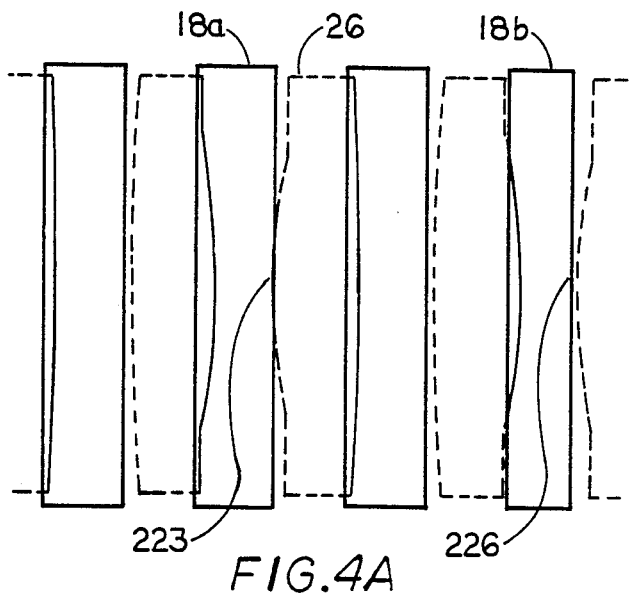

Shown in FIGS. 4A and 4B are developed views of the slots and control orifices of half of the rotary valve 10. FIGS. 4A and 4B illustrate control orifice configurations for centered and offset positions of the inner valve member 12, respectively. Both wide and narrow pressure slots 18a and 18b, respectively, are used in order to reduce the net inlet orifice flow area when the inner valve member is in the offset position. This can be seen in FIG. 4B where the input control orifice 22a is still open but the input control orifice 22b is closed.

The following equations can be used to determine the various orifice area values for a typical vehicular power steering system rotary valve.

$$A_{20a} = 0.452(0.074 + 2.95X_v)^{1.5}$$

$$A_{20b} = 0.452(0.074 - 2.95X_v)^{1.5}$$

$$A_{22a} = 0.446(0.015 + 2.99X_v)^{1.5}$$

$$A_{22b} = 0.446(0.015 - 2.99X_v)^{1.5}$$

$$A_{32} = 0.0741(0.090 + 18.0X_v)^{1.5}$$

$$A_{34} = 0.0741(0.090 - 18.0X_v)^{1.5}$$

where $A_{20a}$, $A_{20b}$, $A_{22a}$, $A_{22b}$, $A_{32}$ and $A_{34}$ are flow orifice areas (in.$^2$) of the orifices 20a, 20b, 22a, 22b, 32 and 34, respectively, and $X_v$ is tangential valve displacement (in.) of the inner valve member 12 from its centered position.

The mathematical function relating output pressure between the two output ports 28 and 30, P(lbs./in.$^2$), the nominally constant fluid flow rate, $Q_s$(in.$^3$/sec.), and the various flow areas is quite complex. However, considerable simplification is achieved if the selected portion of fluid flowing through the output ports 28 and 30 (hereinafter "output flow rate") is zero. (I.e., as would happen if the output ports 28 and 30 were blocked.) In that case $$P = 0.0001Q_s^2[(A_1A_3)^2 - (A_2A_4)^2]/[A_1A_4(A_2^2+A_3^2)^{0.5}+A_2A_3(A_1^2+A_4^2)^{0.5}]^2$$

where $A_1 = 2(A_{20a}+A_{20b})$, $A_2 = 2(A_{22a}+A_{22b})$, $A_3 = 4(A_{32})$ and $A_4 = 4(A_{34})$. Additional simplification is achieved for values of $X_v$ greater than 0.005(in.) where $A_4 = 0$. In that case $$P = 0.0001Q_s^2/(A_2)^2.$$

Concomitantly, the mathematical function relating the pressure of the nominally constant flow rate fluid supplied by the flow control sub-system 52, $P_s$ (lbs./in.$^2$), with $Q_s$ and the various flow areas is $$P_s = 0.0001Q_s^2[(A_1A_2)^2 + (A_1A_3)^2 + (A_2A_4)^2 + (A_3A_4)^2]/[A_1A_4(A_2^2+A_3^2)^{0.5}+A_2A_3(A_1^2+A_4^2)^{0.5}]^2$$

Which also reduces to $$P_s = P = 0.0001Q_s^2/(A_2)^2$$

for values of $X_v$ greater than 0.005 inch.

Figure 5:
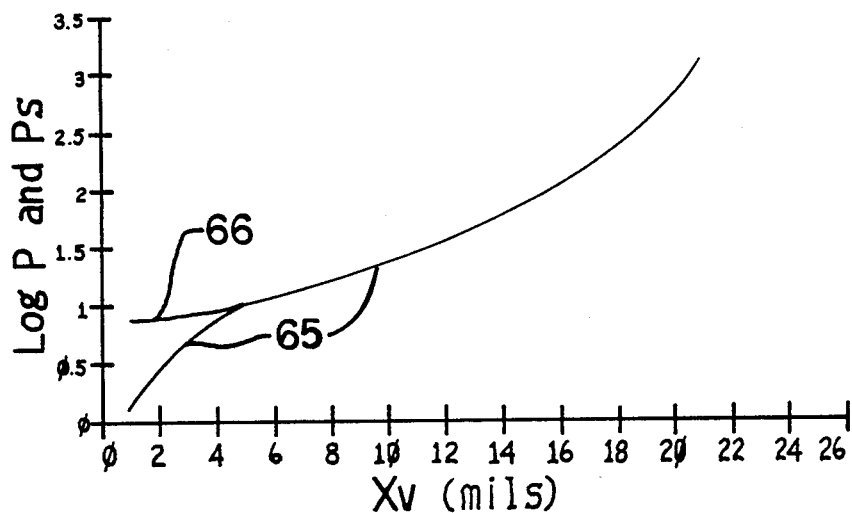
FIG. 5 is a graph showing output pressure of the rotary valve of FIG. 1 vs. inner valve member displacement (hereinafter "valve displacement") therein when its output ports are blocked.

Shown in FIG. 5 is a graph illustrating how P and $P_s$ vary with respect to $X_v$. The data is presented in semi-log form because of the dramatic range of values for P and $P_s$. In FIG. 5, log P is depicted by a curve 65. Log $P_s$ is depicted by a curve 66 for values of $X_v$ smaller than 0.005 inch and by the curve 65 for values of $X_v$ larger than 0.005 inch. The curve 65 terminates at approximately 1200 psi and 21 mils although full valve stroke occurs at 25 mils. (A full family of similar curves accommodating non-zero output flow rates would be located below and to the right of the curve 65.)

Figure 6:
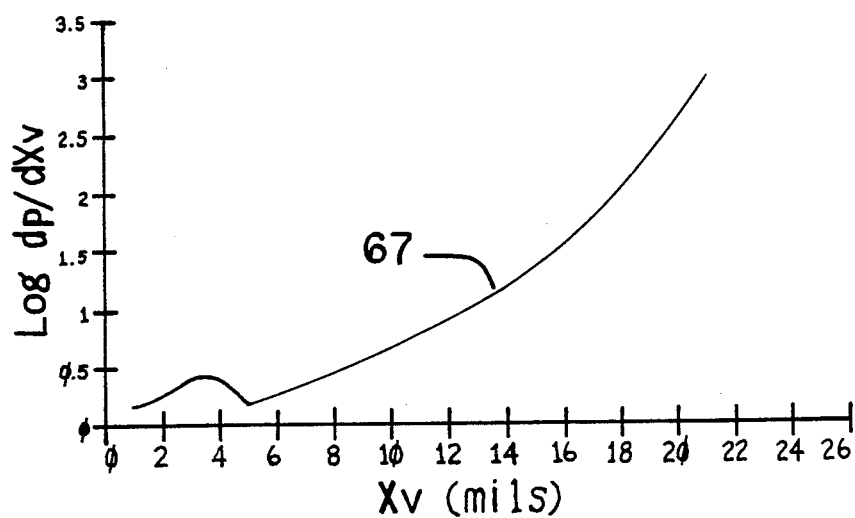
FIG. 6 is a graph showing rate of change of output pressure of the rotary valve of FIG. 1 vs. valve displacement when its output ports are blocked.

Shown in FIG. 6 is a graph illustrating how $dP/dX_v$ varies with respect to $X_v$. The data is presented in semi-log form because of the dramatic range of $dP/dX_v$. In FIG. 6, log $dP/dX_v$ is depicted by a curve 67. The curve 67 terminates at approximately 940 psi/inch and 21 mils although full valve stroke occurs at 25 mils. (A full family of similar curves accommodating non-zero output flow rates would be located below and to the right of the curve 67.) Although the curves 65 and 67 are defined for zero output flow rate only, dynamic performance characteristics for small output flow rates can be derived therefrom, as will be illustrated below.

Figure 7:
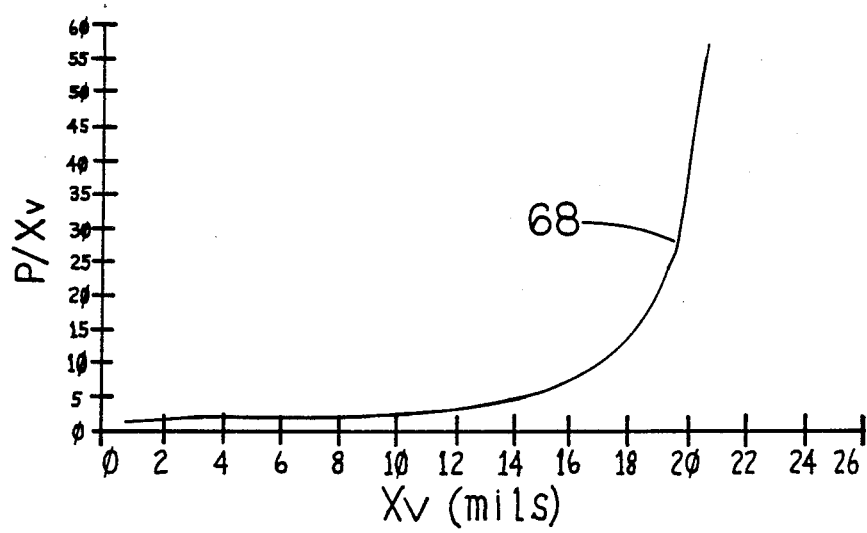
FIG. 7 is a graph showing output pressure/valve displacement vs. valve displacement for the rotary valve when its output ports are blocked.

The dynamic range of the output pressure with respect to valve position can be more fully appreciated by referring to FIG. 7. Shown in FIG. 7 is a curve 68 which depicts the function $P/X_v$ vs. $X_v$. If the relationship between P and $X_v$ were a linear one, $P/X_v$ would be single valued (i.e., a horizontal line in FIG. 7).

As noted hereinabove, road feel is typically introduced by the deflection of the torsion bar 13. The torsion bar 13 typically imparts a torque value of 20(in.lb) concomitantly with the full valve deflection of 25(mils). Also concomitantly, output force is imparted to a vehicle's dirigible (steerable) wheels (not shown) via combined piston (not shown) and rack-and-pinion gear train (also not shown) forces.

Figure 8:
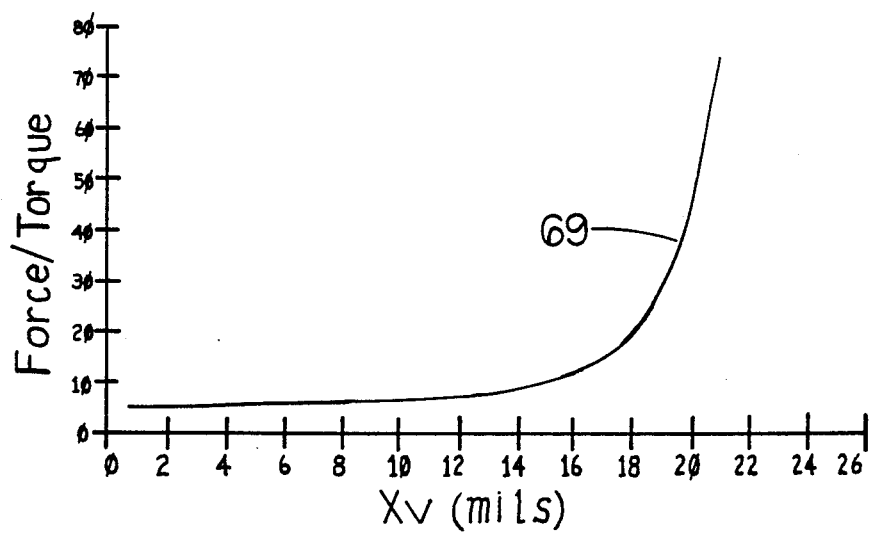
FIG. 8 is a graph showing output force/torque vs. valve displacement for the rotary valve when its output ports are blocked.

Shown in FIG. 8 is a curve 69 which incorporates typical values of piston area and rack-and-pinion ratio to depict output force/torque vs. $X_v$ (where the torque is applied between the inner and outer valve members 12 and 14, respectively). Values chosen herein are a piston area (hereinafter "$A_p$") of 1(in.) and a rack-and-pinion ratio (hereinafter "1/R") of 0.333(in./rad.). The curve 69 serves to illustrate that a driver of a vehicle equipped with a power steering system incorporating the rotary valve 10 is confronted with a control system having a forward gain variation of about 10:1 over its normal range of operation.

Figure 9:
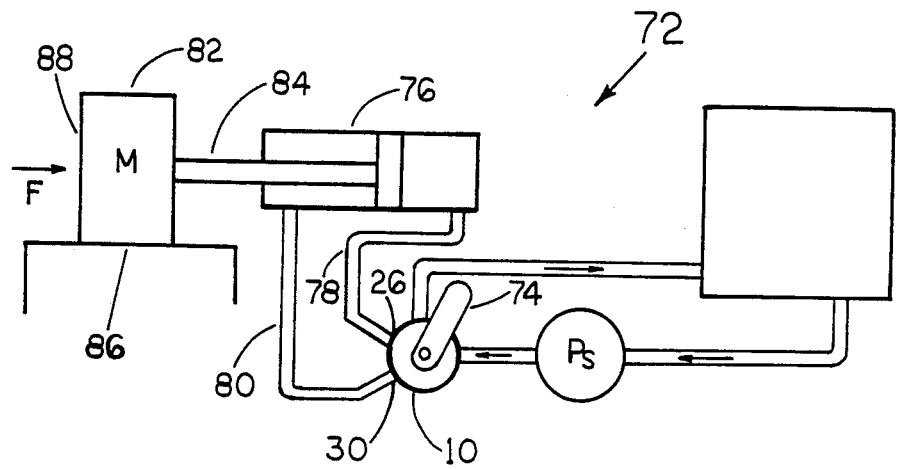
FIG. 9 is a diagramatic drawing of a simple open-loop control system wherein the rotary valve of FIG. 1 is used to control the position of a double acting hydraulic cylinder.

Shown in FIG. 9 is a diagramatic drawing of a simple open-loop control system 72 wherein the rotary valve 10 is used to control the position of a double acting hydraulic cylinder 76. The rotary valve 10 is controlled by a lever 74. The output ports 28 and 30 are coupled to a double acting hydraulic cylinder 76 via output lines 78 and 80, respectively. The hydraulic cylinder 76 is used to position a mass 82 (of mass M) at a position $X_m$ via a ram 84. The mass 82 slides on a low-friction surface 86 and is driven against a force F at 88 by a piston force equal to the product $PA_p$ less a force required to accelerate the mass 82, $M(d^2X_m/dt^2)$.

Figure 10:
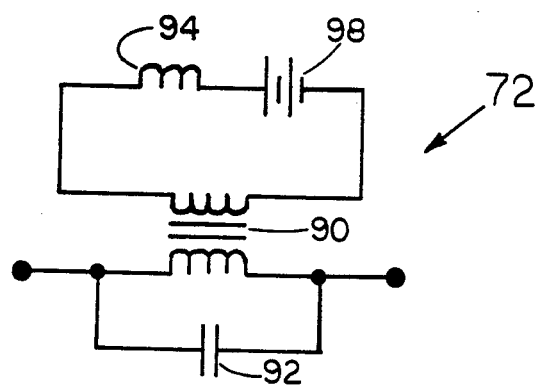
FIG. 10 is a schematic drawing of the open-loop control system of FIG. 9.

Shown in FIG. 10 is a schematic drawing of the open-loop control system 72. An ideal transformer 90, which has a ratio of $A_p:1$, transforms the hydraulic parameters of output pressure and output flow rate associated with the rotary valve 10 into corresponding physical parameters of force and velocity associated with the mass 82. The compliance of the fluid contained within the output lines 78 and 80 and either half of the cylinder 70 is represented by a capacitor 92 (of capacitance C). (C=the total volume of the cylinder 70 plus the output lines 78 and 80, $V_t$, divided by the 4 times the effective bulk modulus, $B_e$, of the fluid where $V_t=7(in.^3)$ and $B_e=70,000(lbs/in.^2)$.) The mass 82 is represented by an inductor 94 (whose value is $M=0.25(lb.sec.^2/in.)$) and the force F is represented by a battery 98.

Values of $X_v$ corresponding to specific values of P can be determined from the curve 65. If the force, F, is known, then $P=F/A_p$ and $X_v$ can be found via the curve 66. In the small signal analysis that follows, $P=P_o+p$, $F=F_o+f$, $X_v=X_{vo}+x_v$, and $A_2=A_{2o}+a_2$ where $P_o$, $F_o$, $X_{vo}$ and $A_{2o}$ are steady state values that correspond to a particular value of the force F; and p, f and $a_2$ are small signals that correspond to small alternating values of valve displacement $x_v$. In addition, q and $x_m$ are small signal values of output flow rate and motion of the mass 82, respectively, which result from non-zero values of $x_v$.

Hereinbelow, calculations are made and performance curves plotted for specific values of $Q_s=4(in.^3/sec.)$, $C=0.000025(in.^5/lb.)$, $M=0.25(lb.sec.^2/in.)$, $A_p=1(in.^2)$ and F=10(lbs), 100(lbs) and 1000(lbs), respectively. All of these force values require values of $X_{vo}$ greater than 0.005(in.) whereby $A_4=A_{22b}=0$. Utilizing the simplified equation for P and the resulting equation $A_2=2A_{22a}$ from those listed above, corresponding values of $X_{vo}=0.0053(in.)$, 0.0159(in.) and 0.0208(in.), respectively, are calculated by transcendental means. These values for $X_{vo}$ result in values of $(0.074-2.95X_{vo})=0.0581(in.^2)$, $0.0268(in.^2)$ and $0.0124(in.^2)$, respectively, which values are used in solving the equations that follow.

By making use of the small signal relationships above, an approximate value for p is found by $$p = -0.0032a_2/A_{2o}^3 - 0.0008q/A_{2o}^2.$$

This equation can be solved for q to yield $$q = -1250A_{2o}^2 p - 4a_2/A_{2o}$$

which can be evaluated by utilizing the hereinabove designated expression for $A_{2o}$ and its derivative with respect to $X_v$ according to $$A_{2o}=0.904(0.074-2.95X_{vo})^{1.5} \text{ and}$$

$$a_2=-4(0.074-2.95X_{vo})^{0.5}x_v.$$

The equation for q can then be differentiated to compute the factors $$K_q=dq/dx_v=17.7/(0.074-2.95X_{vo}) \text{ (in.}^2/\text{sec.) and}$$

$$K_c=-dq/dp=1022(0.074-2.95X_{vo})^3 \text{(in.}5/\text{lb.sec.)}$$

where $K_q$ is rate of change of q with respect to $x_v$ and $K_c$ is rate of change of q with respect to p (whose dimensions depict a hydraulic conductance). These factors can be used to calculate dynamic performance of the open loop control system 72 for F=10(lbs), 100(lbs) and 1000(lbs) according to $$x_m/x_v=(K_q/A_p)/s[(MC/A_p^2)s^2+(K_cM/A_p^2)s+1]$$

where s is the Laplace-transform variable.

(While a detailed derivation of this equation is beyond the scope of this patent application, a thorough understanding of its nature can be obtained by referring to a book entitled HYDRAULIC CONTROL SYSTEMS by Herbert E. Merritt and published by John Wiley & Sons, Inc.)

Figure 11A:
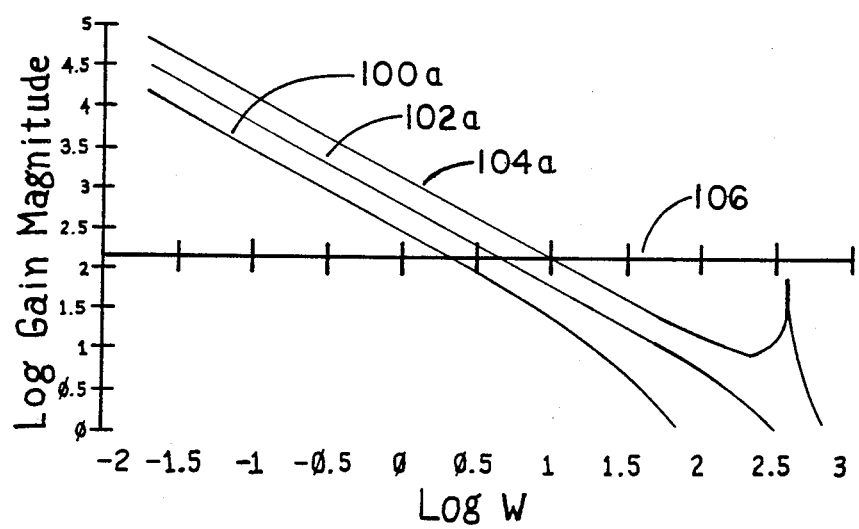
FIGS. 11A and 11B are Bode diagrams which illustrate the dynamic performance range of the open-loop control system of FIG. 9.
Figure 11B:
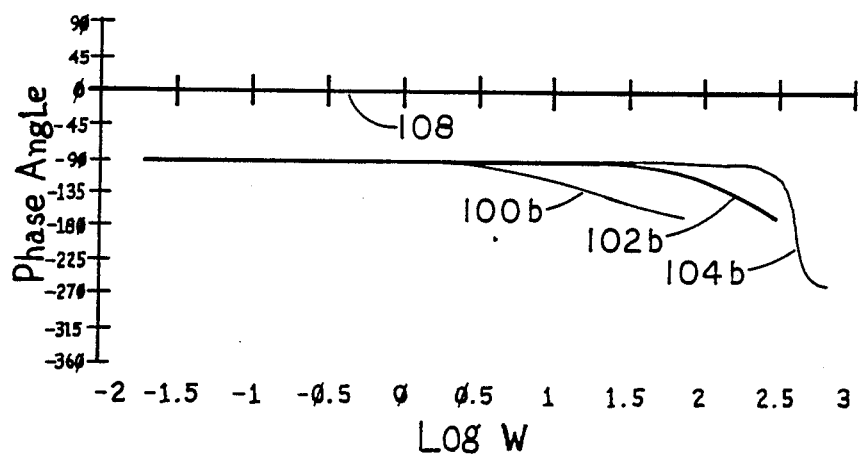

Shown in FIGS. 11A and 11B are Bode diagrams which illustrate gain magnitude and phase angle, respectively, for $x_m/x_v$ as calculated from the above equation. The gain magnitude and phase angle for F=10(lbs), 100(lbs) and 1000(lbs) is depicted by curves 100a, 102a, 104a, 100b, 102b and 104b, respectively. Gain magnitude and phase angle and general curve shape vary considerably as the values of F increase. The curves 100a and 100b are characteristic of a considerably over-damped system, the curves 102a and 102b are characteristic of an over-damped system and the curves 104a and 104b are charateristic of an under-damped system.

An abscissa 106 in FIG. 11A dipicts a minimum value of log gain magnitude that would be a safe value for determining unity gain cross-over in a closed-loop servo system which utilized the rotary valve 10 in conjunction with a "stiff" value of $Q_s$. As can be seen with reference to abscissa 108 of FIG. 11B, values on the curve 104a near a portion 110a thereof include a phase shift of −180 degrees as shown by a portion 110b of the curve 104b. Oscillation of such a closed-loop servo system would occur if the portion 110a of the curve 104a intersected the abscissa 106.

Figure 12:
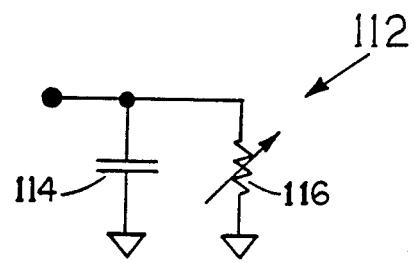
FIG. 12 is an equivalent circuit for a degraded flow control sub-system that can be used in with the open-loop control system of FIG. 9.

The performance curves shown in FIGS. 11A and 11B are not acceptable for use in any practical closed-loop servo system. Considerable improvement can be obtained if the nominally constant flow rate performance of the flow control sub-system 52 is allowed to degrade. Shown in FIG. 12 is an equivalent circuit for a degraded flow control sub-system 112. Fluid flows to the open-loop control system 72 via the constant displacement pump 40 and the flow control valve 62 as before. However, the flow control valve 62 is allowed to have a non-instantaneous response. This is simulated by a capacitor 114 (whose capacitance value is $C_s$). A variable load resistor 116 simulates the variable load nature of the open-loop control system 72 in the degraded flow control sub-system 112.

The resistor 116 is valued $R_s+r_s$ where $R_s=P_s/4(lbs.sec./in.^5)$ and $r_s=p_s/4(lbs.sec./in.^5)$. A small signal analysis results in $p_s=4r_s-q_sR_s$. However, $q_s=C_s dp_s/dt$. Therefore, $$(P_{so}C_s/4)dp_s/dt + p_s = 4r_s.$$

This equation can be solved to yield $$(p_s/4r_s)(4R_s/P_{so}) = 1/[(P_{so}C_s/4)s + 1]$$

which expression can be used to modify the equation for $x_m/x_v$. Thus, new dynamic performance values for the open-loop control system 72 can be calculated according to $$x_m/x_v = (K_q/A_p)/s[(P_{so}C_s/4)s+1][(MC/A_p^2)s^2 + (K_c M/A_p^2)s + 1].$$

Figure 13A:
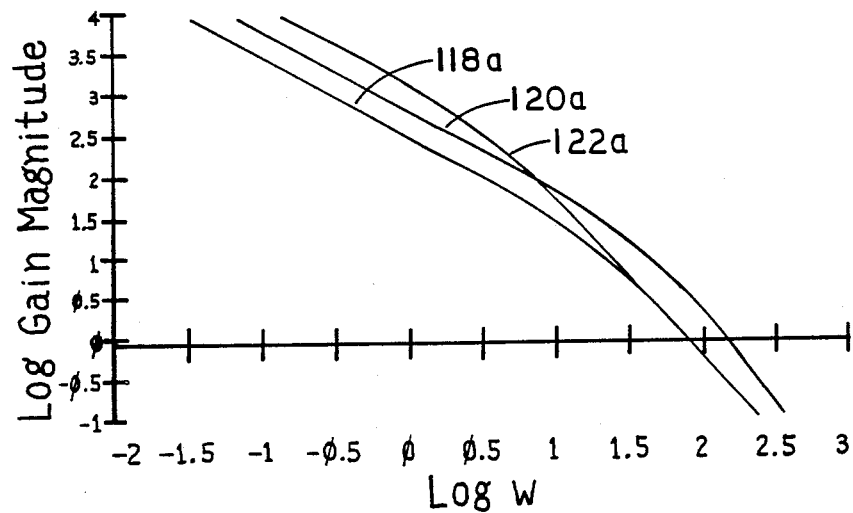
FIGS. 13A and 13B are Bode diagrams which illustrate the dynamic performance range of the open-loop control system of FIG. 9 when the degraded flow control sub-system of FIG. 12 is used therewith.
Figure 13B:
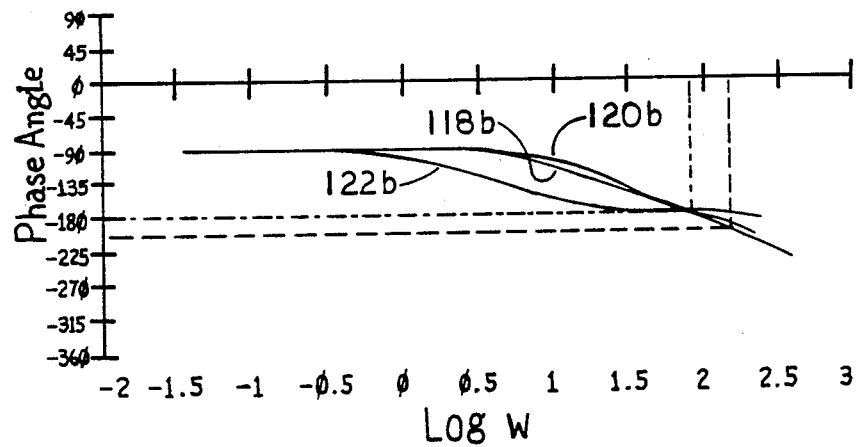

Shown in FIGS. 13A and 13B are Bode diagrams which illustrate gain magnitude and phase angle, respectively, for $x_m/x_v$ as calculated from the above equation. The gain magnitude and phase angle for F=10(lbs), 100(lbs) and 1000(lbs) for a hypothetical value of $(P_{so}C_s/4)=0.25$(sec.) are depicted by curves 118a, 120a, 122a, 118b, 120b and 122b, respectively. The gain magnitude of abscissa 124 was selected to be compatible with the values of $X_v$ vs. 1/R, $K_q$ and $A_p$ mentioned above as well as a valve radius, $R_v$, whose value is 0.4(in.). The hypothetical value 0.25(sec.) for $(P_{so}C_s/4)$ was selected to achieve unity gain cross-over at substantially the same frequency for both F=10(lbs) and 1000(lbs) (i.e., w=89(rad./sec.) or about 14(Hz)). The curves 118a, 120a and 122a are each representative of an over-damped system.

However, there is a concomitant phase angle substantially equal to −180(deg.) at unity gain cross-over for the curves 118a and 122a, as shown by the curves 118b and 122b. Thus, there would be close to 0 degrees phase margin (to a condition of oscillation) at unity gain cross-over for F=10(lbs) and 1000(lbs). Worse, the phase angle at unity gain cross-over for the curve 120a, as shown by the curve 120b, is well beyond −180(deg.) which indicates totally unstable behavior at F=100(lbs).

(These curves are based upon a very hypothetical assumption and are intended to yield qualitative information only. Still, power steering systems often feel quite "rubbery" at intermediate loads - such as those encountered in long sweeping turns (i.e., a freeway on-ramp).)

Described in U.S. Pat. No. 3,819,307 entitled CONTROLLER FOR FLUID PRESSURE OPERATED DEVICES is a controller also comprising a valve mechanism having both inner and outer valve members and servo control operation functionally similar to the rotary valve 10. This controller comprises a fluid metering device which rotationally positions its outer valve member in a "follow-up" manner relative to any input rotational position of its inner valve member. Further comprised within this controller is a spring coupling between the inner and outer valve members which is functionally similar to the torsion bar 13 of the rotary valve 10.

This controller is primarily intended for use as a power steering controller for heavy off-road equipment wherein reflected mass loadings can be significantly greater than assumed hereinabove. Although no discussion of the performance of this controller is presented in U.S. Pat. No. 3,819,307 (i.e., equivalent to that shown in FIGS. 5, 6, 7, 8, 11A, 11B, 13A and 13B), it is interesting to note that its relative angular deflection appears to be many times that of the rotary valve 10. And, its operational gain is further softened by the use of a fluid circuit which comprises a series sequence of three metering orifices—wherein two of these metering orifices are formed by the progressive superposition of a hole and a slot, and the other is formed by the progressive superposition of holes. Thus, such systems are evidently characterized by stable, but sluggish, performance.

Figure 14:
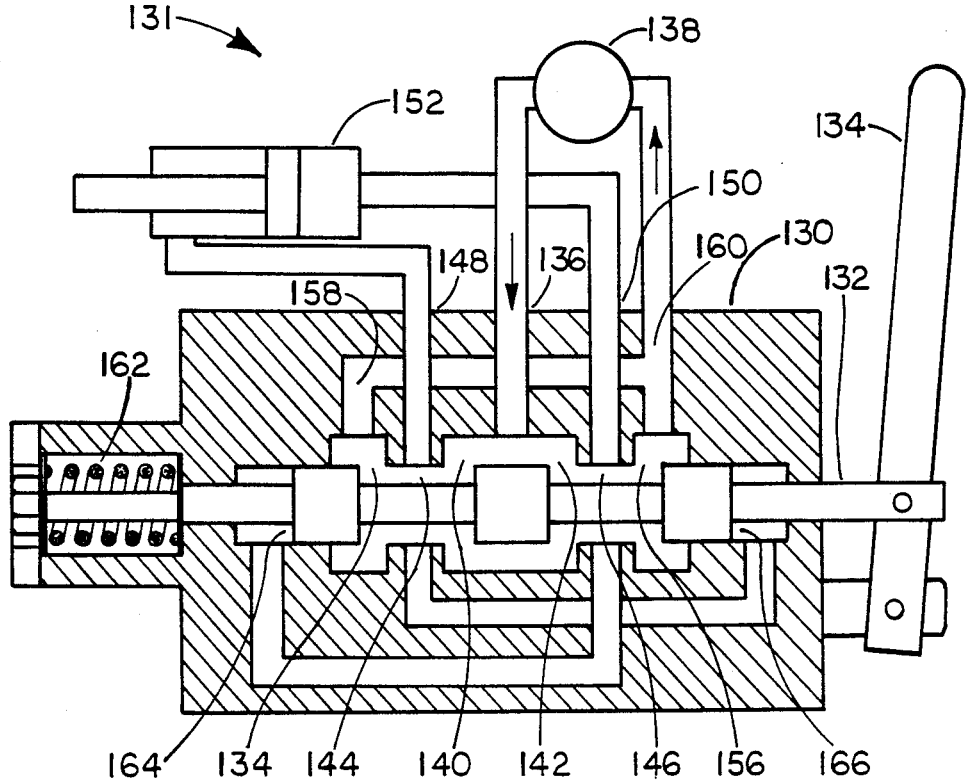
FIG. 14 is a longitudinal section view of a reaction valve.

Alternately, a four-way open center reaction control valve (known as a "reaction valve" herein) can provide somewhat improved performance compared with the rotary valve 10. Shown in FIG. 14 is a simplified longitudinal section view of a pump/valve/cylinder system 131 which is controlled by a reaction valve 130. The reaction valve 130 comprises a spool valve 132 that is driven axially by a lever 134.

Fluid flows into an inlet port 136 via pumping action of a constant delivery pump 138. The fluid then flows past either or both of first and second input control orifices 140 and 142, respectively, to first and second output grooves 144 and 146, respectively. As described above with respect to the rotary valve 10, a selected portion of the fluid flows out one of first or second output ports 148 and 150, respectively, to a double acting power cylinder 152 and returns therefrom via the other one of the first or second output ports 148 and 150, respectively. The fluid then flows past either or both of first and second return control orifices 154 and 156, respectively, and is then returned to the constant delivery pump 138 via either or both return ports 158 and 160, respectively.

Axial motion of the spool valve 132 is opposed by centering action of a preloaded centering spring 162. In addition, differential output pressure (hereinafter called "output pressure, output pressure p or output pressure P") is applied between first and second spool valve end chambers 164 and 166, respectively.

A summation of forces imposed upon the spool valve 132 can be found by the expression $$F_v = K_v X_v + P A_v + F_o$$

where $F_v$ is the summation of forces imposed upon the spool valve 132, $K_s$ is the spring constant of the preloaded centering spring 162, $A_v$ is the net effective area of either of the first and second spool valve end chambers 164 and 166, respectively, and $F_o$ is the initial spring force that must be overcome before motion of the spool valve 132 occurs. In a manner similar to that explained hereinabove with respect to the rotary valve 10, this expression can be reduced to a small signal relationship according to the expression $$f_v = K_s x_v + p A_v$$

where $f_v$ and $p$ are small signal values of $F_v$ and $P$, respectively, that correspond to small alternating values of $x_v$.

Figure 15:
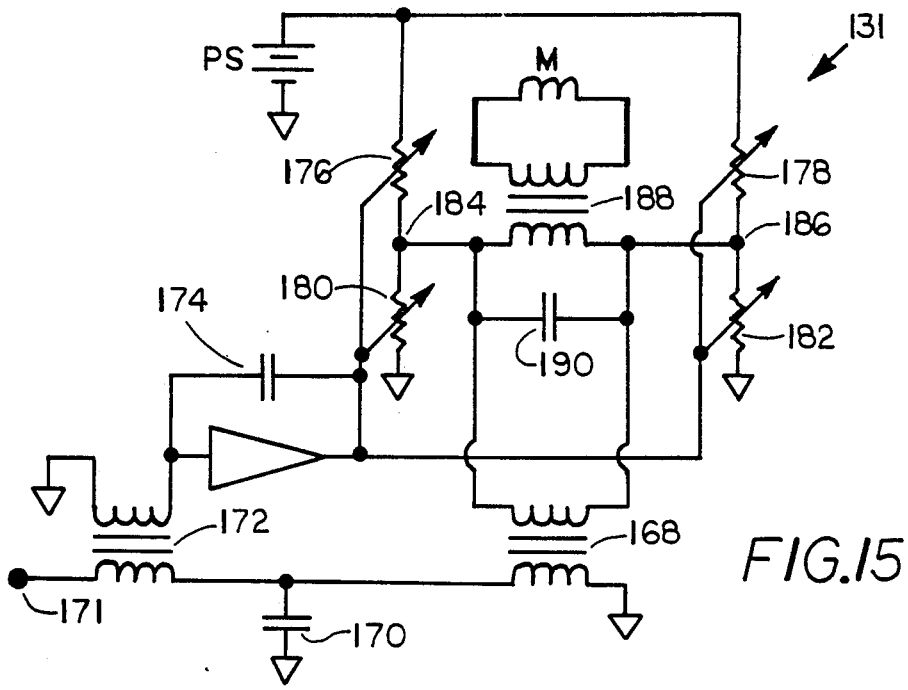
FIG. 15 is a schematic drawing of a simple open-loop control system wherein the reaction valve of FIG. 14 is used to control the position of a mass via a double acting hydraulic cylinder.

Shown in FIG. 15 is a schematic drawing of the simple open-loop control system 131. The force $f_v$ is applied to an ideal transformer 168 (which has the ratio $A_v$:1) and a capacitor 170 (which has the value $1/K_s$) via a terminal 171 and the primary of an ideal velocity transformer 172. The ideal velocity transformer 172 converts mechanical valve velocity $dx_b/dt$ into valve displacement $x_v$ via action of a hypothetical integrating operational amplifier 174. The valve displacement $x_v$ results in variation of values of variable resistors 176 and 178, whose values correspond to the flow characteristics of the first and second input control orifices 140 and 142, respectively, and variable resistors 180 and 182 whose values correspond to the flow characteristics of the first and second return control orifices 154 and 156, respectively. The output pressure p appears between circuit nodes 184 and 186. The output pressure p is applied to another ideal transformer 188 (whose ratio is $A_p:1$) and a capacitor 190 (whose value is C). The ideal transformer 188 transforms the output pressure p into force against a piston 151 of the double acting power cylinder 152.

In order to make a direct performance comparison between the reaction valve 130 and the rotary valve 10, all of the values assumed above with respect to the rotary valve 10 will be utilized in the equations that follow. The equations $$p = -0.0032 a_2/A_{20}^3 - 0.0008 q/A_{20}^2,$$

$$p = (M/A_p)(d^2 x_m/dt^2) \text{ and}$$

$$q = A_p(1 - MCw^2/A_p^2)(dx_m/dt)$$

are mutually solved and evaluated to yield $$x_m/f_v = (Q/K_s A_p A_{20}) |dA_2/dx_v|_o /$$
$$s\,[(MC/A_p^2)s^2 + (5000 M A_{20}^2/Q A_p^2)s +$$
$$((QMA_v/K_s A_{2o} A_p^2)|dA_2/dx_v|_o)s + 1]$$

where $|dA_2/dx_v|_o$ is the absolute value of the rate of change of $A_2$ with respect to $x_v$—as evaluated for a particular steady state condition.

Figure 16A:
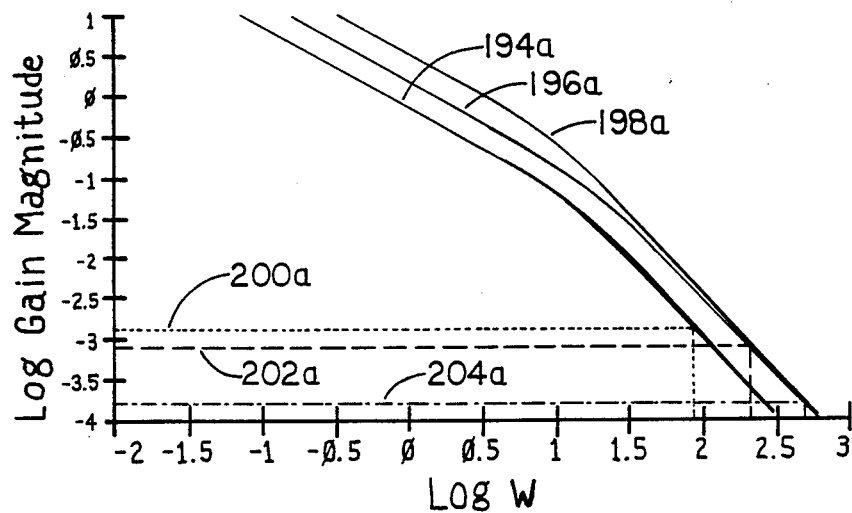
FIGS. 16A and 16B are Bode diagrams which illustrate the dynamic performance range of the open-loop control system of FIG. 15.
Figure 16B:
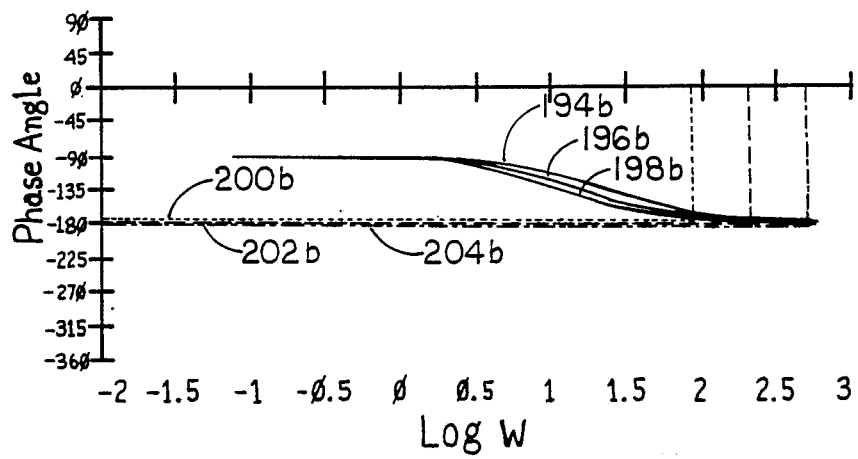

Shown in FIGS. 16A and 16B are Bode diagrams which illustrate gain magnitude and phase angle, respectively, for $x_m/f_v$ as calculated from the above equation. The gain magnitude and phase angle for F=10(lbs), 100(lbs) and 1000(lbs) are depicted by curves 194a, 196a, 198a, 194b, 196b and 198b, respectively.

Because both spring force (via the preloaded centering spring 162) and output pressure derived force (via the first and second spool valve end chambers 164 and 166, respectively, are comprised within $x_m/f_v$, unity gain servo-loop magnitude values vary with F. Unity gain servo loop magnitude values can be determined by manipulating the equations $$f_v = K_s x_v + p A_v \text{ and}$$

$$x_v = 1.2 x_m \text{ to yield}$$

$$x_m/f_v = (1/1.2 K_s)[1 - (p A_v/(K_s x_v + p A_v))_o]$$

(where the factor 1.2 is derived from $R_v/R = 0.4/0.333$ —the values assumed hereinabove with respect to the rotary valve 10, and $(pA_v/(K_s x_v + pA_v))_o$ is evaluated for any particular steady state condition). Horizontal lines 200a, 202a and 204a of FIG. 16A depict values of $x_m/f_v$ for F=10(lbs), 100(lbs) and 1000(lbs), respectively.

All of the curves 194a, 196a and 198a are representative of over-damped systems. However, phase angles of approximately −180(deg.) are concomitantly present—as depicted by horizontal lines 200b, 202b and 204b, of FIG. 16B, respectively.

DESCRIPTION OF THE PREFERRED EMBODIMENTS

The present invention embodies apparatus and control methods which enable proportional and stable control of the position of a hydraulically actuated, double acting utilization device. In the present invention, a torque reaction valve is provided wherein reaction torque is generated within the torque reaction valve itself. This is accomplished by applying output pressure directly between differential surfaces of first and second valve members. Torque application therebetween is unopposed by any spring member analogous to the preloaded centering spring 162.

Closed-loop servo systems utilizing the torque reaction valve of the present invention to position a mass are stabilized by energy loss associated with motion of the mass. In order to positively control the magnitude of such energy loss, a damper valve assembly, also of the present invention, may be introduced into hydraulic circuits comprised within such closed-loop servo systems.

Figure 17:
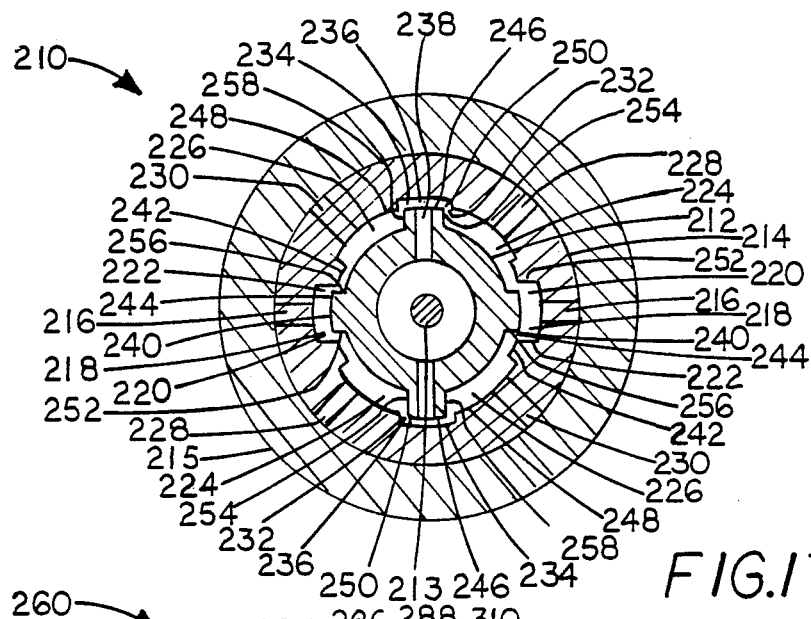
FIG. 17 is a diametrical section view of a torque reaction valve according to a preferred embodiment of the present invention.

Shown in FIG. 17 is a diametrical section view of a torque reaction valve 210. The torque reaction valve 210 comprises a torsion bar 213, inner and outer valve members 212 and 214, respectively, and a valve body 215. As will be described below, input torque is applied to the outer valve member 214 while feedback torque is applied to the inner valve member 212 via the torsion bar 213. Then the magnitude of the resulting output pressure is linearly related to the applied torque.

Fluid from a constant flow hydraulic fluid source (not shown) flows into the rotary valve 210 via input ports 216 and into pressure slots 218. The fluid then flows past either or both sets of first and second input control orifices 220 and 222, respectively, to sets of first and second output slots 224 and 226, respectively. A selected portion of the fluid flows out one of first and second output ports 228 and 230, respectively, to a double acting utilization device (not shown in FIG. 17) and returns therefrom via the other one of the first and second output ports 228 and 230, respectively. The fluid then flows past either or both sets of first and second return control orifices 232 and 234, respectively, into return slots 236. The fluid is then returned to a tank (not shown) via return ports 238 and an internal drain path (also not shown in FIG. 17).

All of the above described ports, slots and control orifices are depicted as balanced sets of two ports, slots and control orifices, respectively. Such balanced pairs of ports, slots and control orifices eliminate radial forces between the inner and outer valve members 212 and 214, respectively. In general, any number, N, of ports, slots and control orifices greater than one (arranged, however, in a balanced manner) may be utilized for the various sets of ports, slots and control orifices. Sets of four (i.e., N=4) ports, slots and control orifices are particularly common.

Outside surfaces 240 of the inner valve member 212 and inside surfaces 242 of the outer valve member 214 comprise functional surfaces of the first and second sets of input control orifices 220 and 222, respectively, and are radially sized with minimal clearance therebetween. Lands 244 of the inner valve member 212 are formed selectively narrower than the pressure slots 218 of the outer valve member 214 in order to effect proper underlapped valve input orifice (i.e., open center) characteristics. Similarly, outside surfaces 246 of the inner valve member 212 and inside surfaces 248 of the outer valve member 214 comprise functional surfaces of the first and second sets of return control orifices 232 and 234, respectively, and are sized with minimal clearance therebetween. Lands 250 of the inner valve member 212 are formed selectively narrower than the return slots 236 of the outer valve member 214 in order to effect proper underlapped valve return orifice characteristics. Representative differential widths of both of the pressure slots 218 and the return slots 236, and the lands 244 and lands 250, respectively, comprise a range of 4(mils) to 8(mils).

The output pressure comprises the difference between first and second values of pressure present in the first and second output slots 224 and 226, respectively. The first and second values of pressure communicate with both lateral surfaces 252 and 254, and lateral surfaces 256 and 258, respectively. In addition, the outside surfaces 246 of the inner valve member are formed at larger radii than the outside surfaces 240 of the inner valve member. Thus, the lateral surfaces 254 and 258 are larger in area and are located at larger effective radii than the lateral surfaces 252 and 256, respectively. Therefore, non-zero output pressures will concomitantly generate torque between the inner valve member 212 and the outer valve member 214. The torque generated therebetween is determined by $$T = A_v P R_v$$

where T is the torque, $A_v$ is effective net valve area (and is equal to the product of the difference in radii between the outside surfaces 246 and the outside surfaces 240, length of the valve, and N), P is the output pressure and $R_v$ is the effective radius of the effective net valve area, $A_v$.

Figure 18A:
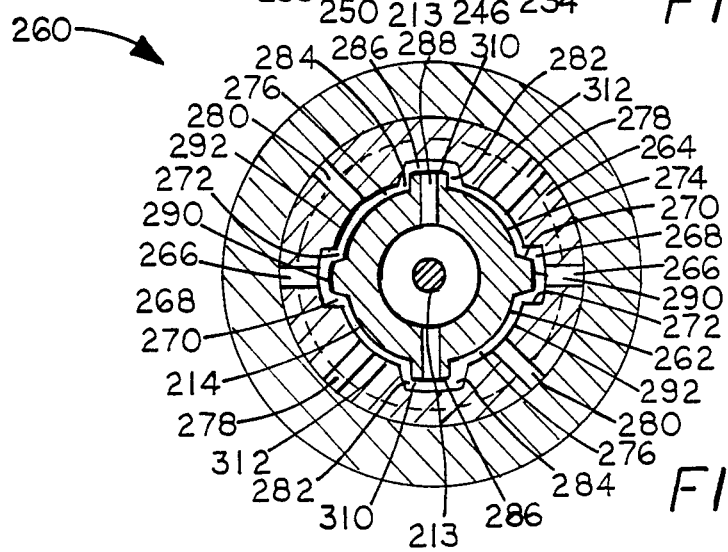
FIG. 18A is a diametrical section view of a torque reaction valve according to an alternate preferred embodiment of the present invention.

Shown in FIG. 18A is a diametrical section view of an another preferred embodiment of a torque reaction valve 260 also of the present invention. The torque reaction valve 260 comprises inner and outer valve members 262 and 264, respectively. Fluid from a constant flow hydraulic fluid source (not shown) flows into the rotary valve 260 via input ports 266 and into pressure slots 268. The fluid then flows past either or both sets of first and second input control orifices 270 and 272, respectively, to sets of first and second output slots 274 and 276, respectively. A selected portion of the fluid flows out one of first and second output ports 278 and 280, respectively, to a double acting utilization device (not shown in FIG. 18A) and returns therefrom via the other one of the first and second output ports 278 and 280, respectively. The fluid then flows past either or both sets of first and second return control orifices 282 and 284, respectively, into return slots 286. The fluid is then returned to a tank (not shown) via return ports 288 and an internal drain path (also not shown in FIG. 18A).

All of the above described ports, slots and control orifices are depicted as balanced sets of two ports, slots and control orifices, respectively. Such balanced pairs of ports, slots and control orifices eliminate radial forces between the inner and outer valve members 262 and 264, respectively. In general, any number of ports, slots and control orifices greater than one (arranged, however, in a balanced manner) may be utilized for the various sets of ports, slots and control orifices. Sets of four ports, slots and control orifices are particularly common.

Figure 18B:
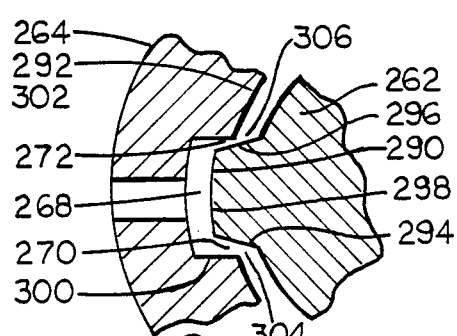
FIGS. 18B and 18C are enlarged sectional views of an inlet control orifice and a return control orifice, respectively, of the torque reaction valve of FIG. 18A.

Outside surfaces 290 of the inner valve member 262 are formed at a larger radius than inside surfaces 292 of the outer valve member 264. This is shown more clearly in FIG. 18B which is an enlarged sectional view of one set of a pressure slot 268 and first and second input control orifices 270 and 272, respectively. The first and second input control orifices 270 and 272, respectively, comprise lateral surfaces 294 and 296 of a land 298 of the inner valve member 262 and lateral surfaces 300 and 302 of the pressure slot 268, respectively. The lateral surfaces 294 and 296, and the lateral surfaces 300 and 302, are formed such that gaps 304 and 306 therebetween become progressively narrower with respect to fluid flow direction which occurs from larger to smaller radii therebetween. Thus, the first and second input control orifices 270 and 272, respectively, are formed in the manner of reducing nozzles whose exit widths are the minimum values of the gaps 304 and 306, respectively.

Figure 18C:
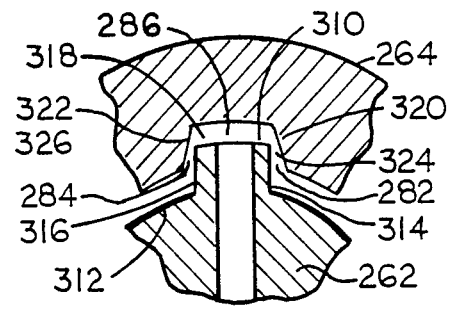

Outside surfaces 310 of the inner valve member 262 are formed at a larger radius than inside surfaces 312 of the outer valve member 264. This is shown more clearly in FIG. 18C which is an enlarged sectional view of one set of a return slot 286 and first and second return control orifices 282 and 284, respectively. The first and second return control orifices 282 and 284, respectively, comprise lateral surfaces 314 and 316 of a land 318 of the inner valve member 262 and lateral surfaces 320 and 322 of the return slot 286, respectively. The lateral surfaces 314 and 316, and the lateral surfaces 320 and 322, are formed such that gaps 324 and 326 therebetween become progressively narrower with respect to fluid flow direction which occurs from smaller to larger radii therebetween. Thus, the first and second return control orifices 282 and 284, respectively, are formed in the manner of reducing nozzles whose exit widths are in the minimum values of the gaps 324 and 326, respectively. Ideally, the exit widths of the gaps 304, 306, 324 and 326 are all made substantially equal wherein representative gap width values comprise a range of 2(mils) to 4(mils).

The output pressure comprises the difference between first and second values of pressure present in the first and second output slots 274 and 276, respectively. The first and second values of pressure communicate with both lateral surfaces 294 and 314, and lateral surfaces 296 and 316, respectively. Even though the outside surfaces 290 and 310 of the inner valve member 262 may be formed at equal radii (as shown in FIG. 18A), the effective radial positions of the first and second return control orifices 282 and 284, respectively, are formed at larger radii than the effective radial positions of the first and second input control orifices 270 and 272, respectively. This is because the effective radial position of the first and second input control orifices 270 and 272, respectively, are formed at substantially the same radius as the inner surfaces 292 of the outer valve member 264.

Thus, portions of the lateral surfaces 314 and 316 which are subjected to the output pressure are larger in area and are located at larger effective radii than portions of the lateral surfaces 294 and 296 which are subjected to the output pressure, respectively. Therefore, non-zero output pressures will concomitantly generate torque between the inner valve member 262 and the outer valve member 264. The torque generated therebetween is determined by $$T = A_\nu P R_\nu$$

(where in this case A is equal to the product of the difference in radii of the portions of the lateral surfaces 314 and 316, and 294 and 296, respectively, which are subjected to the output pressure, the length of the valve, and N).

Figure 19:
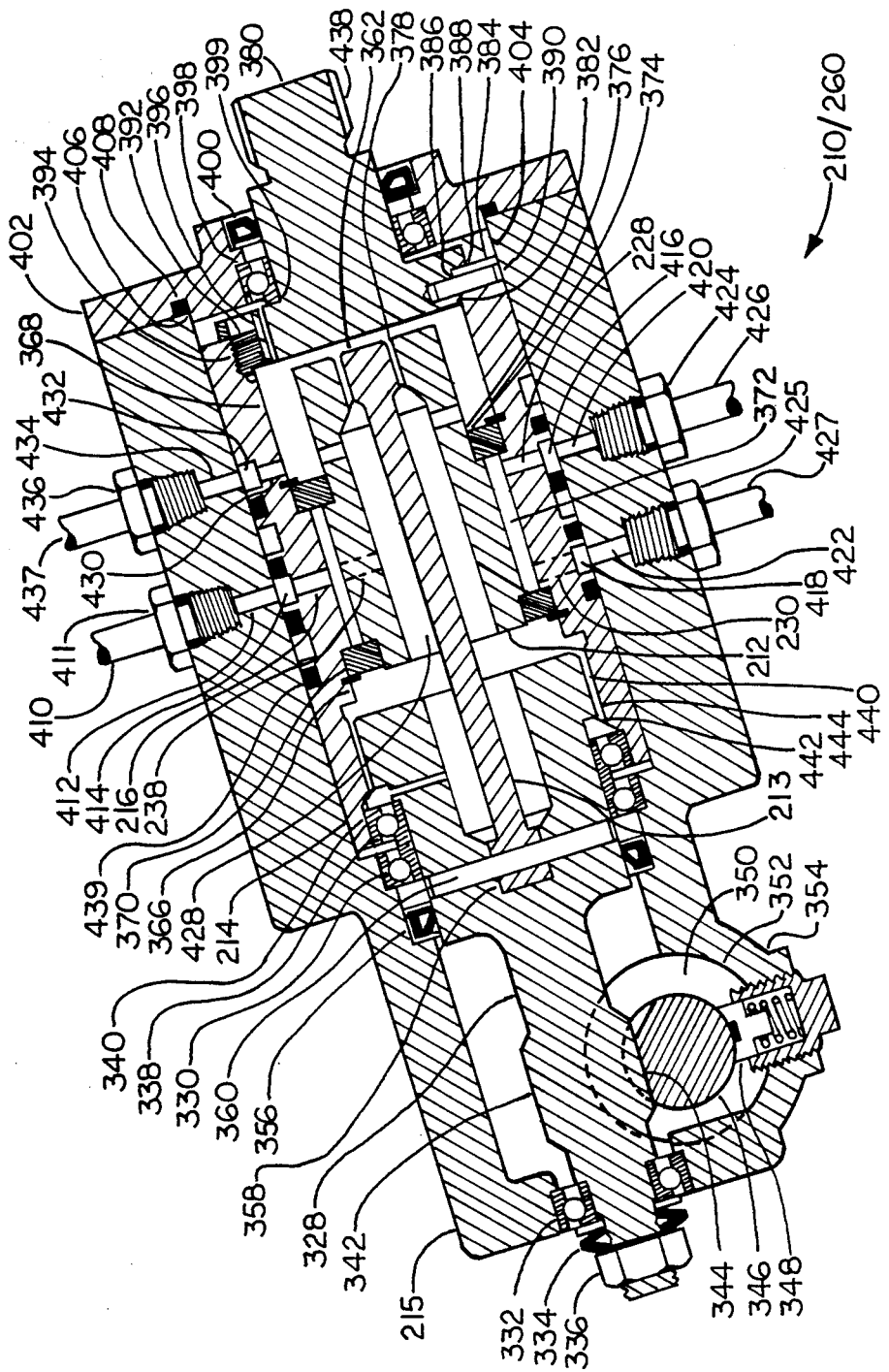
FIG. 19 is a longitudinal section view which is representative of the torque reaction valves of both FIGS. 17 and 18A-C.

Shown in FIG. 19 is a longitudinal section view which is representative of either the torque reaction valve 210 or the torque reaction valve 260. (The description that follows uses the part numbers shown in FIG. 17 for the torque reaction valve 210. However, the following description applies equally to the torque reaction valve 260 and could be repeated using the part numbers shown in FIGS. 18A-C. Therefore, it should be considered to be a generic discussion equally applicable to both the torque reaction valves 210 and 260.)

Disposed within the lower end of the valve body 215 is a pinion shaft 328. It is located therein by ball bearings 330 and 332 wherein axial preload is provided by Belleville spring washers 334 and retaining nut 336. Mounted adjacent the ball bearing 330 is another ball bearing 338 upon whose outer race is located the lower end of the outer valve member 214 via a counterbore 340 therein.

Pinion gear teeth 342 are formed on the pinion shaft 328. Rack gear teeth 344 of a rack assembly 346 are held in mesh with the pinion gear teeth 342 by a spring loaded bearing yoke 348 in a known manner. Axially disposed along the rack assembly 346 is a piston 350. The piston 350 is located within a double acting cylinder 352 formed within a casting 354 which also comprises the valve body 215—all formed in a known manner. A shaft seal 356 provides a barrier to migration of either hypoid oil commonly utilized to lubricate the rack-and-pinion gear section or power steering fluid commonly utilized as fluid within the torque reaction valve 210.

Fixedly mounted within a bore 358 formed within the pinion shaft 328 is the lower end of the torsion bar 213. The torsion bar 213 is retained and rotationally oriented therein by a pin 360. The upper end of the torsion bar 213 is formed with a male spline 362. To facilitate later assembly of the inner valve member 212 thereon, the male spline 362 is formed with a number of teeth equal to an integral multiple of the number N of sets of ports, slots and control orifices comprised in the inner and outer valve members 212 and 214, respectively, wherein the teeth are rotationally oriented in a selective manner with respect to the pin 360.

The outer valve member 214 is formed with a counterbore 366 in its lower end and a counterbore 368 in its upper end. The inner valve member 212 is axially assembled within the outer valve member 214. Barrier rings 370 are assembled within the counterbore 366 and 368 and forcibly retained at the ends thereof by beveled internal retaining rings such as Waldes Truarc part number N5002-112 manufactured by Waldes Kohinoor, Inc. of Long Island City, N.Y.

The axial region 372 (of the axially assembled inner and outer valve members 212 and 214, respectively) comprises the active portions of the torque reaction valve 210 as shown in FIG. 17. The respective lengths of the active portions of the inner and outer valve members 212 and 214 are formed such that there is minimal axial operating clearance between the inner valve member 212 and the barrier rings 370. The minimal operating clearance provides a nominal flow barrier between the various slots and control orifices. Concomitantly, bores 374 of the barrier rings 370 and shaft portions 376 of the inner valve member 212 are formed such that a free running bearing fit is established therebetween.

A splined hole 378 is formed in the upper end of the inner valve member 212. The splined hole 378 is sized such that it achieves a slidable mesh with the male spline 362. In addition, it is rotationally oriented such that a selected orientation of the inner valve member with respect to the male spline and therefore the pin 360 can be maintained. Thus, feedback torque is transmitted substantially without hysteresis from the pinion shaft 328 to the inner valve member 212 via the pin 360, angular deflection of the torsion bar 213, and mesh of the male spline 362 and the splined hole 378. This method of transmitting the feedback torque avoids axial overconstraint between the inner valve member 212 and either of the barrier rings 370.

An input shaft 380 is located with respect to counterbore 382 and face 384 of the outer valve member 214 by a pilot boss 386 and a shoulder 388. It is affixed thereto alternately by a plurality of pins 390 or a plurality of set-screws 392 wherein the set-screws 392 are treadably engaged in threaded half holes 394 in the outer valve member 214 and bear against the bottom of half holes 396 in the input shaft 380. The advantage of affixing the input shaft 380 to the outer valve member 214 via the plurality of set-screws 392 is that subsequent disassembly of the torque reaction valve 210 is thereby facilitated.

A ball bearing 398 and a shaft seal 400 are installed in an input housing 402. A wave washer 399, the ball bearing 398 and shaft seal 400 are slidably assembled over the input shaft 380 as the input housing 402 is axially installed onto the valve body 215. The input housing 402 is located radially in main bore 404 of the valve body 215 by a pilot boss 406, and affixed to the valve body 215 by treaded bolts (not shown). Hydraulic fluid is prevented from leaking between the input housing 402 and the valve body 215 by an O-ring seal 408.

Fluid flows through the torque reaction valve 210 generally as described above with respect to FIG. 17. However, detailed fluid flow into and/or out of the rotating assembly of the inner and outer valve members 212 and 214, respectively, is as follows:

Input fluid flows from a fluid source (not shown) through an input line 410, input fitting 411 and input passage 412 through an input slip ring 414 and finally to each of the input ports 216. Similarly, output fluid flows to or from either of the sets of first and second output ports 228 and 230, respectively, via first or second output slip rings 416 and 418, respectively, through first or second output passages 420 and 422, respectively, first or second output fittings 424 and 425, respectively, and first and second output lines 426 and 427, respectively, to or from either end of the cylinder 352, respectively. Finally, return fluid from the return ports 238 flows into an annular cavity 428 occupying the space between the torsion bar 213 and the inside of the inner valve member 212, out through return holes 429 and 430, and through return slip ring 432, return passage 434, return fitting 436 and return line 437 to a tank (not shown). In addition, four seal rings 439 are utilized to preclude leakage from the input slip ring 414 or either of the output slip rings 416 and 418.

In operation, a torque T(in.lbs) is applied to splines 438 formed on the input shaft 380. The torque is transmitted to the outer valve member 214 via the pins 390 or set-screws 392 and the outer valve member 214 rotates slightly. One of the sets of first and second input control orifices 220 or 222, respectively, and the other of the sets of return control orifices 232 or 234, respectively, is enlarged in area while the opposite sets are reduced in area. Output pressure is generated which may result in motion of the piston 350 via fluid flow to and from the cylinder 352. Any motion of the piston 350 will concomitantly result in motion of the rack assembly 346 and "follow up" rotational motion of the pinion 328 and lower end of the torsion bar 213. This rotational motion of the lower end of the torsion bar 213 will generally lag the rotation of the outer valve member 214 by a slight angle which may be thought of as the servo system error.

Concomitantly, the applied torque will be opposed by an identical torque generated by the output pressure acting upon the effective net valve area as defined above (i.e., wherein $T = A_v PR_v$). This torque will also cause the inner valve member 212 to rotate in the same direction as the outer valve member 214 (but with less error than the pinion shaft 328) and impart concomitant rotation to the upper end of the torsion bar 213 via the splined hole 378 and the male spline 362. The simultaneous lagging rotation of the lower end and almost full rotation of the upper end of the torsion bar 213 results in the torsion bar 213 twisting by an angle $\theta_e$(rad.). The angle $\theta_e$ is a measurement error angle with the value $$\theta_e = 10.2(l_t T / G d_t^4)$$

where $l_t$ is the effective length of the torsion bar 213, G is the shearing modulus of elasticity, and $d_t$ is the diameter of the effective length of the torsion bar 213. Thus, the relative angular displacement of the inner valve member 212 with respect to the pinion shaft 328 is linearly related to the applied torque T and has the value $\theta_e$—which can be evaluated as defined above.

Should a failure of the hydraulic system occur (i.e., such as by failure of a pump supplying fluid to the torque reaction valve 210), the feedback torque will be absent and $\theta_e$ must be otherwise limited. This is accomplished in the torque reaction valve 210 by a tangentially loose fitting spline set 440 comprising a male spline 442 formed on the upper end of the pinion shaft 328 and a female spline 444 formed within the outer valve member 214. Thus, such a failure would result in the applied torque T being directly applied to the pinion shaft 328 via the spline set 440. (I.e., representative nominal values for the angular clearance of the male spline 442 within the female spline 444 comprise a range of $\pm 0.05$(rad.) to $\pm 0.2$(rad.).)

To facilitate axial assembly of the pre-assembled inner and outer valve members 212 and 214, respectively, onto the ball bearing 338 and the male spline 362 of the torsion bar 213, the spline set 440 is formed with a number of teeth equal to an integral multiple of the number N of sets of ports, slots and control orifices comprised within the pre-assembled inner and outer valve members 212 and 214, respectively.

Although application to vehicular power steering has been assumed hereinabove in discussing the torque reaction valve 210, no such limitation in its use is appropriate. The torque reaction valve 210 can be used together with any hydraulically actuated, double acting utilization device to perform a wide variety of tasks. All that is required to complete closed-loop systems utilizing the torque reaction valve 210 is a suitable feedback path enabling application of feedback torque to the bottom end of the torsion bar 213.

Rotational motions greater than the angle $\theta_e$ are not necessarily required in such systems. For instance, the torque reaction valve 210 could be used in a very simple servo system to position a cylinder driven slide against a travel limit. All that would be required would be a spring bias on the rack assembly 346 which urges the cylinder driven slide toward the travel limit. When the travel limit struck the end of the rack assembly 346, the servo system would control the cylinder driven slide's position against the travel limit. The possibilities are endless and no attempt is made to catalog them by including a large number of additional application oriented figures herein.

Figure 20:
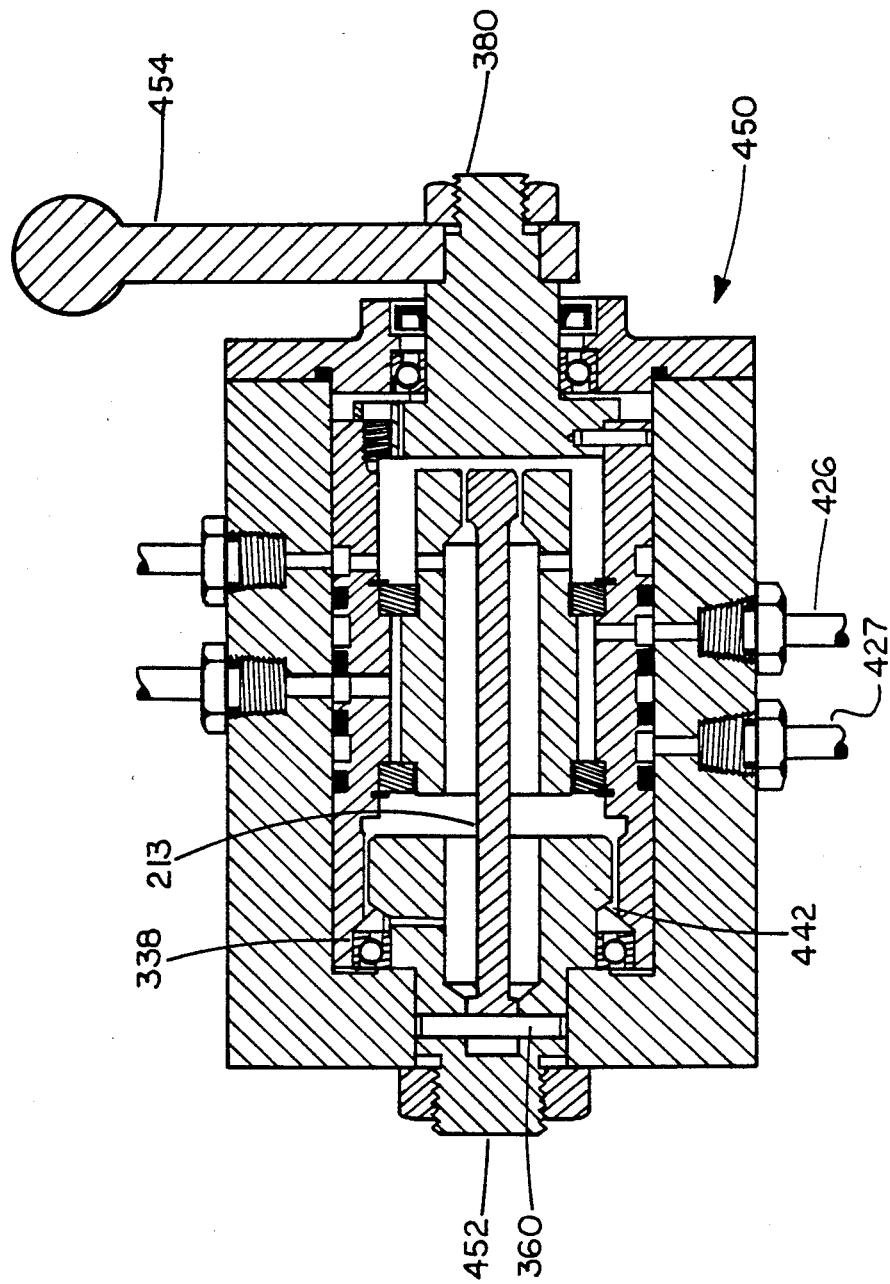
FIG. 20 is a longitudinal section view of a hand operated controller which comprises a torque reaction valve.

In addition, it is possible to use the basic apparatus of the torque reaction valve as an independent controller without feedback. For instance, shown in FIG. 20 is simple differential pressure controller 450. In the differential pressure controller 450 the rotationally movable pinion shaft 328 is replaced by an immovable reaction torque fitting 452. In addition to providing an anchor for the lower end of the torsion bar 213 (via the pin 360), the reaction torque fitting 452 comprises the male spline 442 and provides a cylindrical mounting surface for the ball bearing 338. A handle 454 is mounted on the input shaft 380. Thus, rotation of the handle 454 is possible within the angle $\pm \theta_e$ with concomitant linearly related differential output pressure available at the first and second output lines 426 and 427, respectively. Again, possible applications are limitless. For instance, such a differential pressure controller could be utilized in an "open-loop" control system for opening or closing a large hydraulically actuated valve.

Figure 21:
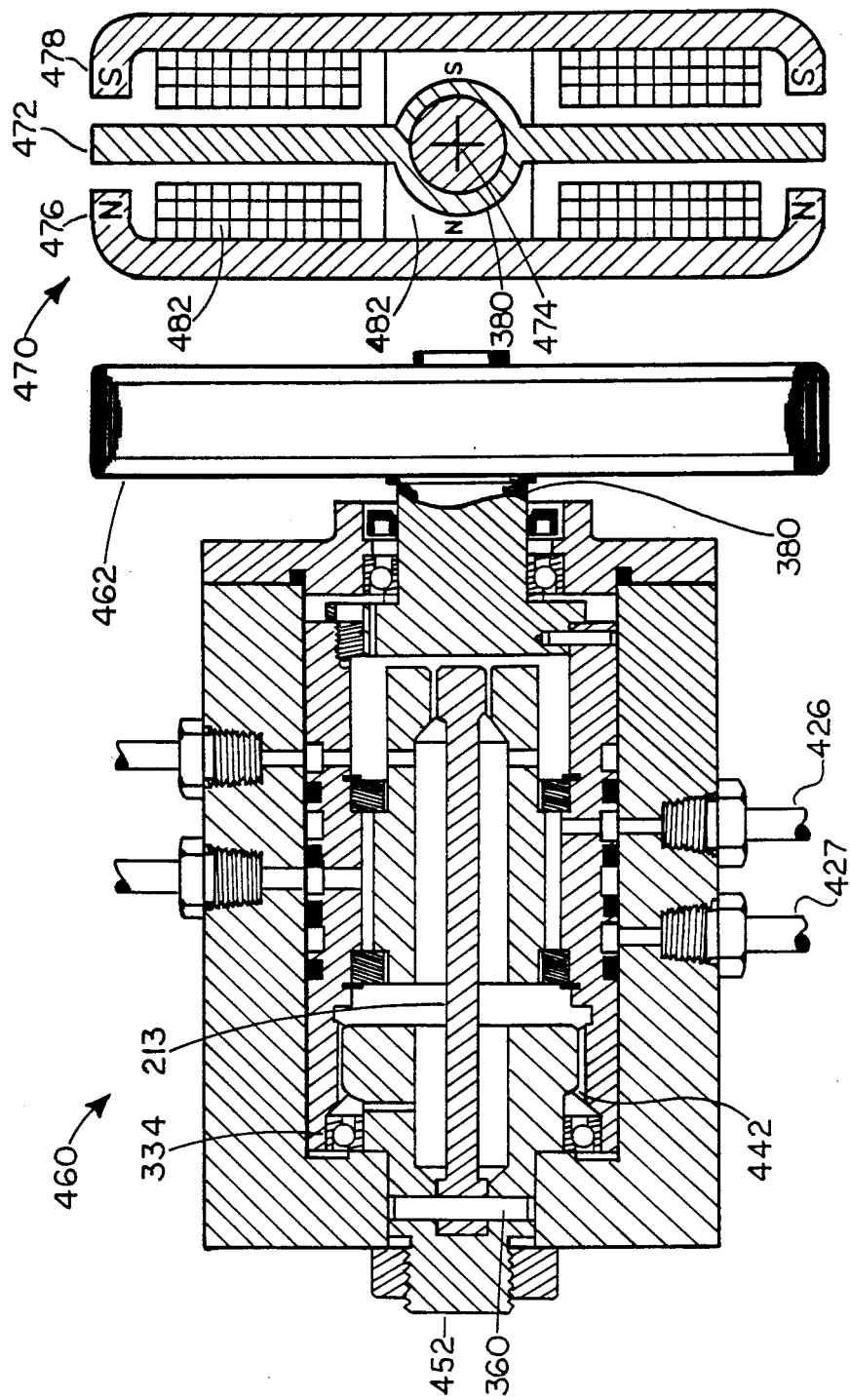
FIG. 21A is a longitudinal section view of an electro-hydraulic servo valve which comprises a torque reaction valve.
FIG. 21B is an end view which illustrates a preferred embodiment of a limited excursion torque motor utilized with the electro-hydraulic servo valve shown in FIG. 21A.

If electro-mechanical or other controllable drive means are substituted for the handle 454, a servo-valve is brought into being. For instance, shown in FIG. 21A is an electro-mechanical (i.e., motor driven) servo-valve 460. The electro-mechanical servo-valve 460 is identical with the differential pressure controller 450 except that the handle 454 has been replaced by an electrically actuated motor 462. Suitable examples of electrically actuated motors can be found in a line of limited rotation DC torque motors manufactured by Aeroflex Laboratories Inc. of Plainview, N.Y.

An alternate preferred embodiment for a limited rotation DC torque motor is shown in FIG. 21B. Shown in FIG. 21B is a torque motor 470. The design of the torque motor 470 is closely related to DC torque motors used by a number of manufacturers for activating two-stage servo-valves of present design. Usually, such DC torque motors are utilized to position a pilot flapper valve and comprise a motor pivot which is located eccentrically with respect to the DC torque motor itself. Often such pivots comprise a flexure tube which serves to exclude fluid from the pilot flapper valve from the DC torque motor. Typical examples of such DC torque motor controlled two-stage servo-valves can be found in a line of servo-valves manufactured by Moog Inc. of East Aurora, N.Y.

In the torque motor 470, an armature bar 472 is affixed concentrically about the input shaft 380. Thus, the armature bar 472 pivots a pivot point 474 which is substantially coincident with the center line of the input shaft 380. Pole pieces 476 and 478 are mounted upon field magnets 480. The field magnets are unidirectionally oriented (magnetically) such that the pole piece 476 is north poled and the pole piece 478 is south poled. A pair of armature coils 482 are provided wherein both of the armature coils 482 are hooked up in an additive manner so that the armature bar 472 becomes an electro-magnet whose pole orientation and magnitude are set by current direction and magnitude in the armature coils 482.

Typically, the armature bar 472 is formed from a "soft" magnetic material having a tall but narrow hysteresis loop of small area. The combined dimensions of the armature bar 472, the field magnets 480 and the pole pieces 476 and 478 are controlled such that clearance is provided between the ends of the armature bar and the pole pieces 476 and 478 for maximum values of $\theta_e$.

In operation, a current passing through the armature coils 482 causes one end of the armature bar 472 to be north poled and the other to be south poled. Then the north poled end of the armature bar 472 is repelled by the north poled pole piece 476 and attracted by the south poled pole piece 478. Conversely, the south poled end of the armature bar 472 is attracted by the north poled pole piece 476 and repelled by the south poled pole piece 478. Thus, torque is generated by the armature bar 472. Currents in the armature coils 482 (and therefore flux levels in the armature bar 472) are held to values wherein there is a linear relationship between current and motor torque.

As noted hereinabove, closed-loop servo systems utilizing the torque reaction valve 210 to position a mass are stabilized by energy loss associated with motion of the mass. Similarly generated energy loss will also have a stabilizing effect upon systems utilizing hydraulic circuits controlled by either the differential pressure controller 450 or the electro-mechanical servo-valve 460.

Under optimum conditions, suitable energy loss may be generated independent from the hydraulic circuits. For instance, an automotive type shock absorber could be coupled to a load to control oscillations of a system which comprises one of these hydraulic circuits. Alternately, a damper valve assembly may be introduced into either, or both, of the first and second output fittings 424 and 425, respectively, or lines 426 and 427, respectively.

An optimum damper valve assembly for this purpose is characterized by having a selected hydraulic resistance (hereinafter "resistance") function. In general, a simple orifice having a square law flow characteristic wherein pressure drop is proportional to fluid flow rate (hereinafter "flow rate") squared is unacceptable. Its resistance function would be determined by $$R_a = P_a/Q_a = Q_a/10000A_a^2 = (P_a)^{0.5}/100A_a$$

where $R_a$ is the resistance of the orifice, $P_a$ is the pressure drop (hereinafter "pressure") across the orifice, $Q_a$ is the fluid flow rate through the orifice, and $A_a$ is the area of the orifice. Thus, the resistance of an orifice increases linearly with increasing flow rate.

Figure 22:
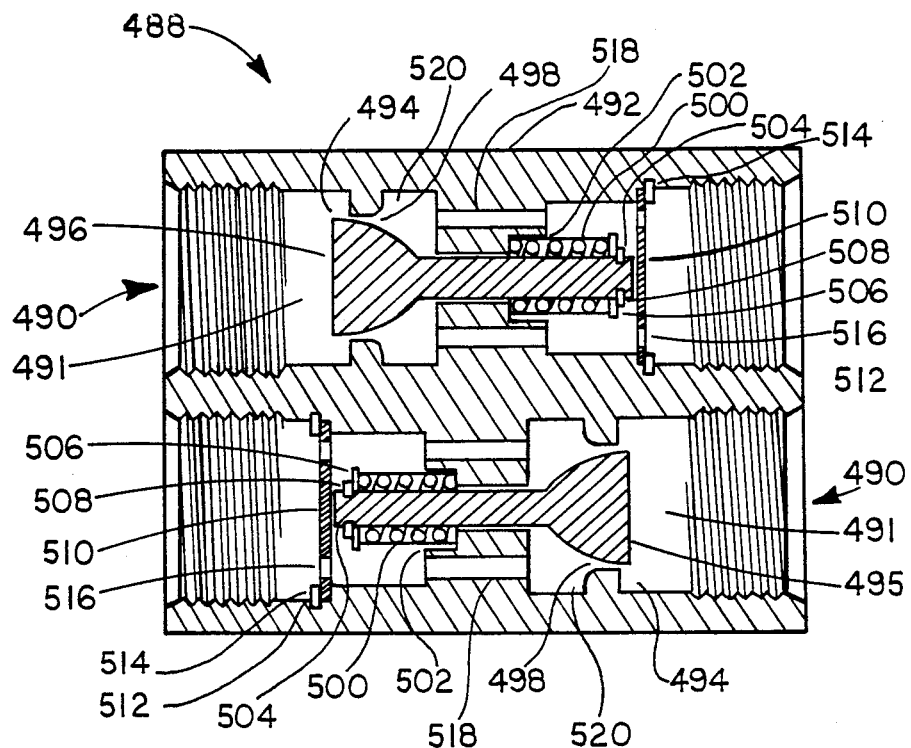
FIG. 22 is a sectional view of two directional controlled orifice flow restrictors (herein called a "hydraulic resistor") which are mounted side-by-side and oriented in opposite directions.

A damper valve assembly 488 having a selected resistance function is shown in FIG. 22. The damper valve assembly 488 comprises two damper valves 490, each having nominal one-way flow characteristics. They are mounted side-by-side in bores 491 a valve body 492 and the damper valves 490 are oriented therein in reversed flow directions to accomodate two-way flow. Each damper valve 490 comprises a set of the following items:

An oversized orifice counterbore 494 is formed in the valve body 492 which counterbore 494 is selectively filled by a contoured valve member 496. Thus, an annular orifice 498 is formed which has a selected resistance vs. flow characteristic determined by an individually selected contour on the contoured valve member 496 as combined with selected stiffness and preload of a spring 500 used to retard outward motion of the contoured valve member 496. The spring 500 is located in a counterbore 502 and applies force to a stem 504 of the contoured valve member 496 via a washer 506 and a retaining ring 508. Return travel of the contoured valve member 496 is limited by a disc 510 which is retained in a counterbore 512 in the valve body 492 by a retaining ring 514. Fluid passage to the annular orifice 498 is effected via holes 516 and 518 formed in the disc 510 and valve body 492, respectively, and an annular chamber 520 also formed in the valve body 492.

Figure 23:
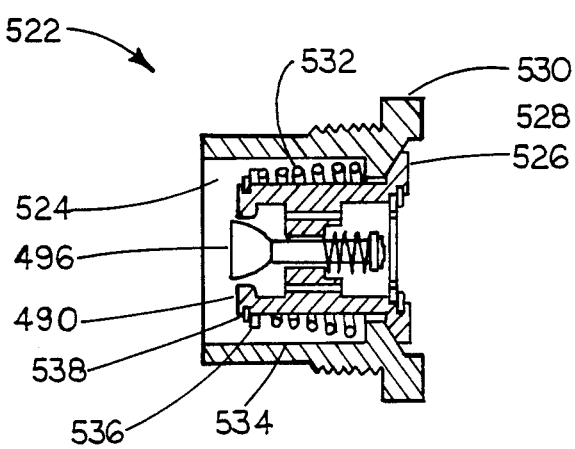
FIG. 23 is a sectional view of a single controlled orifice flow restrictor mounted within a check valve.

Shown in FIG. 23 is an alternate damper valve assembly 522 wherein a damper valve 490 is mounted in a bore 524 in a check valve 526 wherein one set of all of the above described counterbores, spring, retaining rings, disc and holes are formed or disposed in similar juxtaposition to a contoured valve member 496. The check valve 526 is urged against a spherical seat 528 formed in a check valve body 530 by a spring 532 which is located in a counterbore 534 and applies seating force to the check valve 526 via a washer 536 and retaining ring 538.

The damper valve 490 is oriented so that its nominal flow direction is opposite that of the check valve 526. Thus, flow is nominally unimpeded in one direction but encounters a resistance R in the other. Utilizing one of the damper valve assemblies 522 in each of output lines 426 and 427 enables similar pressures to be maintained in either side of the double acting cylinder 352 for similar motions in either direction.

Figure 24:
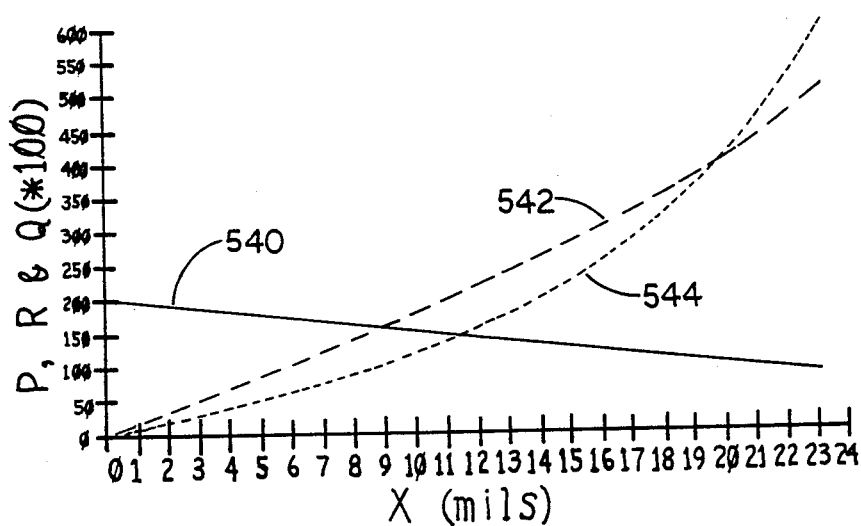
FIG. 24 is a graph showing flow resistance, pressure drop and flow rate vs. displacement for a controlled orifice flow restrictor.

While a single valued resistance value is often chosen as the resistance function for a particular design of the damper valve 490, a selected variable resistance function may be chosen as well. For instance, shown in FIG. 24 are a set of performance curves for a damper valve 490 wherein a resistance function that decreases with respect to motion of the contoured valve member 496 is used. Resistance function, R(lbs.sec./in.$^5$), is illustrated by curve 540 while pressure drop, $P_d$(lbs/in.$^2$), and flow rate, $Q_d$(in.$^3$/sec.), are illustrated by curves 542 and 544, respectively. In FIG. 24, the values shown for R, $P_d$ and $Q_d$ assume zero preload of the spring 500 and they are plotted vs. displacement of the contoured valve member 496, $X_d$(mils). A procedure for designing a damper valve 490 is illustrated via the following example calculation for a damper valve 490 having the performance depicted in FIG. 24.

Because the annular orifice 298 has a wedge shaped flow, its flow coefficient is about 50 percent higher than a sharp edged orifice. Thus, $$Q_d = P_d/R = 150 A_d (P_d)^{0.5}$$

where $A_d$ is the flow area of the annular orifice 298. Also, $$R = 200 - 5000 X_d.$$

$$A_d = \pi[(0.047)^2 - r_d^2]$$

where $X_d$ is a displacement value for the contoured valve member 496 and $r_d$ is a value representative of a particular radius of the contoured valve member 496. Also, valve force is determined by $$F_d = K_d X_d = P_d \pi r_d^2$$

where $K_d$ is the spring constant of the spring 500 which is determined by the relationship $$P_d = 400 (\text{lbs/in.}^2) \text{ when } X_d = 20 (\text{mils}).$$

Figure 25:
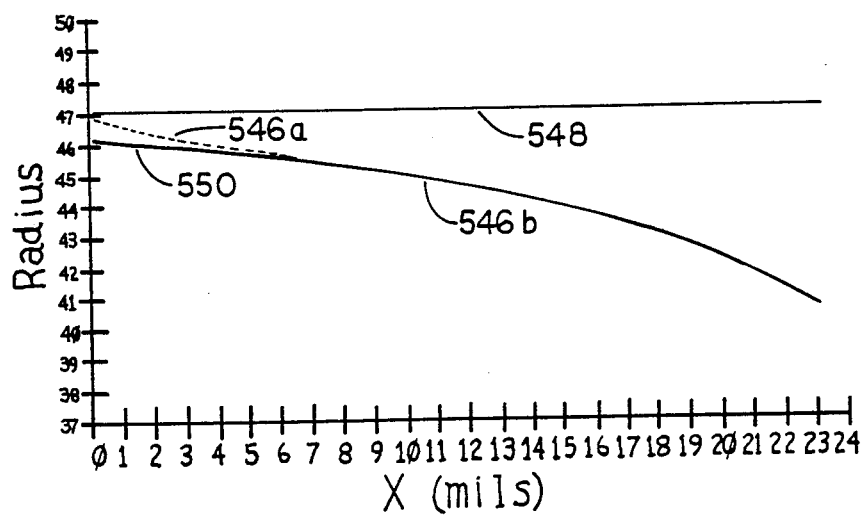
FIG. 25 is a graph showing contoured valve member clearance vs. displacement for a controlled orifice flow restrictor.

When these equations are mutually solved, $X_d$ is found by $$X_d = [(20 + 0.0309 P_d) - (400 - 1.236 P_d + (0.01189 P_d)^{1.5} + (0.000955 P_d)^2)^{0.5}]/1000$$

and points generating the curves 540, 542 and 544 are evaluated in a transcendental manner. In addition, values of $r_d$ are also calculated. These values are plotted as curves 546a and 546b in FIG. 25. At $X_d = 0$, the curve 546a has the same value as curve 548 whose value is that of the inside radius of the counterbore 494.

However, the above equations assume that all energy loss in the damper valve 490 is due to kinetic energy loss. Actual loss is partially due to viscous flow energy loss. In fact this form of energy loss is dominant for very small clearances. For instance, power steering fluid has an absolute viscosity of 0.0000171(lb.sec./in.$^2$) at an operating temperature of 170(deg.F.) and according to a formula presented in the book entitled HYDRAULIC CONTROL SYSTEMS mentioned hereinabove, $$R' = P_d/Q_d = 6\mu L_d/\pi r_d c_d$$

where $R'$ is the resistance of such an orifice and $L_d$ is a length associated with a portion of smaller values of $c_d$. $c_d$, in turn, is the radial clearance between the curve 548 and a combined curve 550 and 546b. The curve 550 is a chosen continuation of the curve 546b which designates contour requirements of the contoured valve member 496 to effect the values of R shown by the curve 540 in FIG. 24.

Figure 26A:
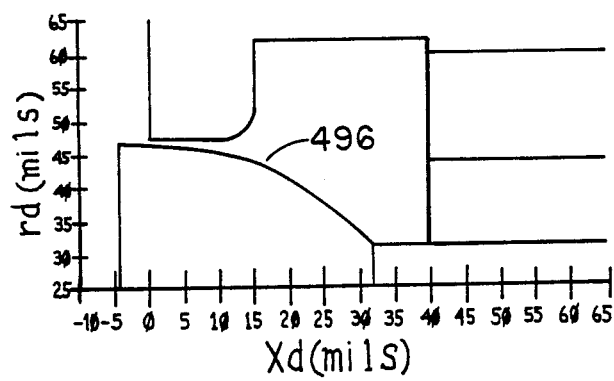
FIGS. 26A, 26B and 26C are diagramatic graphs which illustrate positions of a controlled orifice for displacements corresponding to zero, quarter and full flow, respectively.
Figure 26B:
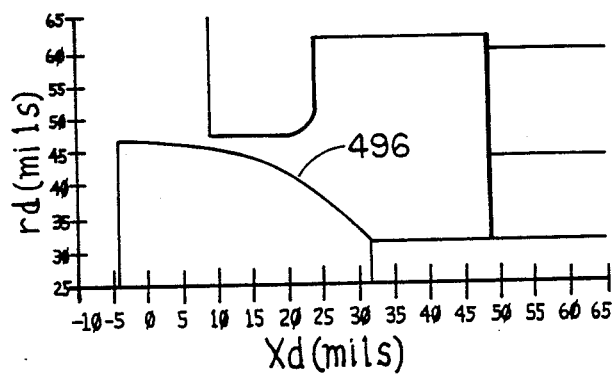
Figure 26C:
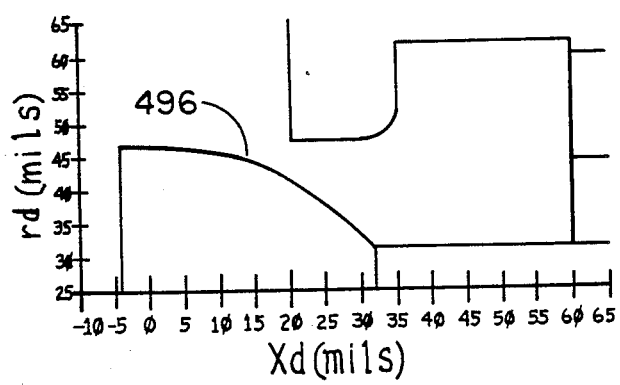

The actual contour of the contoured valve member 496 is determined by progressively taking the values of $c_d$ resulting from the difference between the curve 548 and the curves 546b and 550 and swinging radii with a compass to generate a curve which is then used for the actual contour. Shown in FIGS. 26A, 26B and 26C are enlarged views of the actual contour of the contoured valve member 496 wherein $X_d = 0$(mils), 8.9(mils) and 20.0(mils), respectively. These are values of $X_d$ for which $Q_d = 0$(in.$^3$/sec.), 1(in.$^3$/sec.) and 4(in.$^3$/sec.), respectively.

Figure 27:
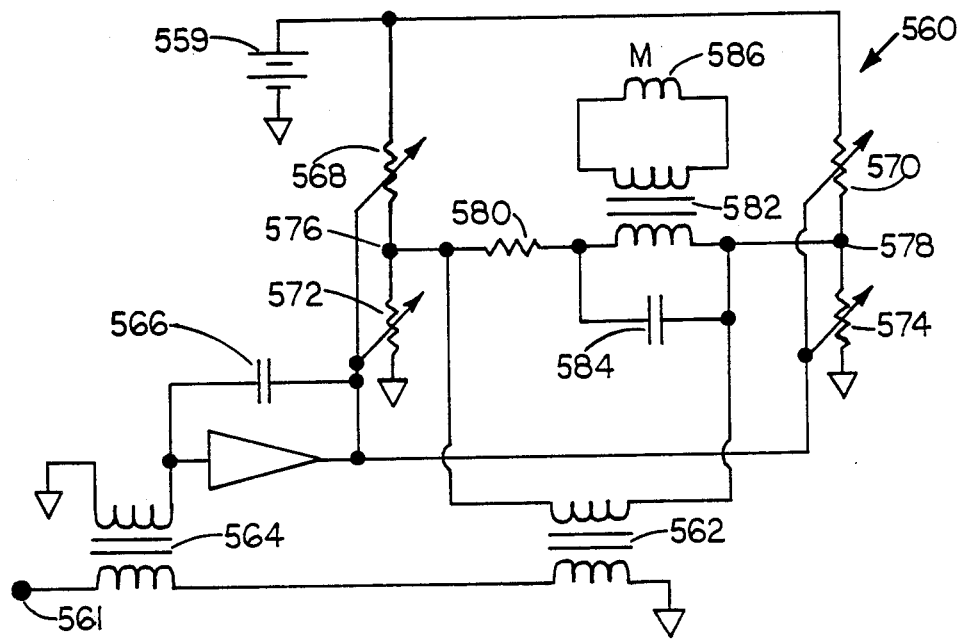
FIG. 27 is a schematic drawing of a simple open-loop control system wherein a torque reaction valve and a hydraulic resistor are utilized to control the position of a mass via a double acting hydraulic cylinder.

Open-loop operation of the torque reaction valve 210 augmented by a particular damper valve assembly 488 having a single valued resistance of 200(lb.sec./in.$^5$) can be determined by analyzing a schematic circuit 560 shown in FIG. 27. If an effective radius, $R_v$, of an effective valve area, $A_v$, is chosen equal to 0.4(in.), then $$F_v = T/0.4$$

where $F_v$ is the force imposed upon the effective valve area, $A_v$, and T is the torque imposed upon the input shaft 380.

As illustrated in the schematic circuit 560, a pump unit 559 delivers input flow rate $Q_s$ to a bridge circuit comprising variable resistors 568, 570, 572 and 574. In addition, $F_v$ is applied to the primary of an ideal transformer 562 (which has the ratio $A_v$:1) via a terminal 561 and the primary of an ideal velocity transformer 564. The ideal velocity transformer 564 converts tangential valve velocity $dX_v/dt$ into valve displacement $X_v$ via action of a hypothetical integrating operational amplifier 566. The valve displacement $X_v$ results in variation of values of the variable resistors 568 and 570, whose values correspond to the flow characteristics of the first and second input control orifices 270 and 272, respectively, and the variable resistors 572 and 574, whose values correspond to the flow characteristics of the first and second return control orifices 282 and 284, respectively. Output pressure P appears between circuit nodes 576 and 578.

The output pressure P is applied to a circuit comprising a resistor 580 that is series connected with a parallel combination of the primary of an ideal transformer 582 and a capacitor 584, all in parallel with the secondary of the ideal transformer 562. The ideal transformer 582 simulates the area of the piston 350 (which has the ratio $A_p$:1). The ideal transformer 582 transforms pressure applied to the piston 350 into force which is applied to an inductor 586 (which has the value M). The capacitor 584 simulates the capacitance of the fluid trapped in the cylinder 352 (which has the value C). The ideal transformer 562 simulates the effective net valve area (which has the ratio $A_v$:1). The transforming action of the ideal transformer 562 simulates the relation $$P = F_v/A_v.$$

(The above designated circuit elements have the following values in the examples below: M = 0.25(lb.sec.$^2$/in.), C = 0.000025(in.$^3$/lb), $A_p$ = 1(in.$^2$) and $A_v$ = 0.1(in.$^2$).)

As soon as a circuit becomes more complex than a series or parallel combination of circuit elements, the simplest way to analyze it is by using a method known as the Ladder Method, which method is explained in a book entitled ELECTRICAL ENGINEERING CIRCUITS by Hugh Hildreth Skilling and published by John Wiley & Sons, Inc. In utilizing this method for the pressure/flow problems herein, a velocity of $dX_m/dt$ is assumed to flow in the inductor 586. Then the flow rate across the primary of the transformer 582 is $A_p(dX_m/dt)$ and the pressure drop across the primary of the transformer 582 is $(jwM/A_p)(dX_m/dt)$. This pressure is divided by the impedance of the capacitor 584, $(-j/wC)$ to determine the flow rate through the capacitor 582 (which is $(-1)(w^2MC/A_p)(dX_m/dt)$). These flow rates are then summed and multiplied by the resistance value of the resistance 580, R, to determine the pressure drop across the resistor 580. This pressure drop is summed with the pressure drop across the primary of the transformer 582 to determine a concomitant value for the output pressure P. This is multiplied by the effective valve area $A_v$ which results in an equation relating $(dX_m/dt)$ to $F_v$ in terms of R, $A_p$, $A_v$, w, M and C. Finally, the resulting equation is rearranged and the Laplace-transform variable s is applied which results in the block transfer function $$X_m/F_v = (1/RA_pA_v)/s[(MC/A_p^2)s^2 + (M/RA_p^2)s + 1]$$

Figure 28A:
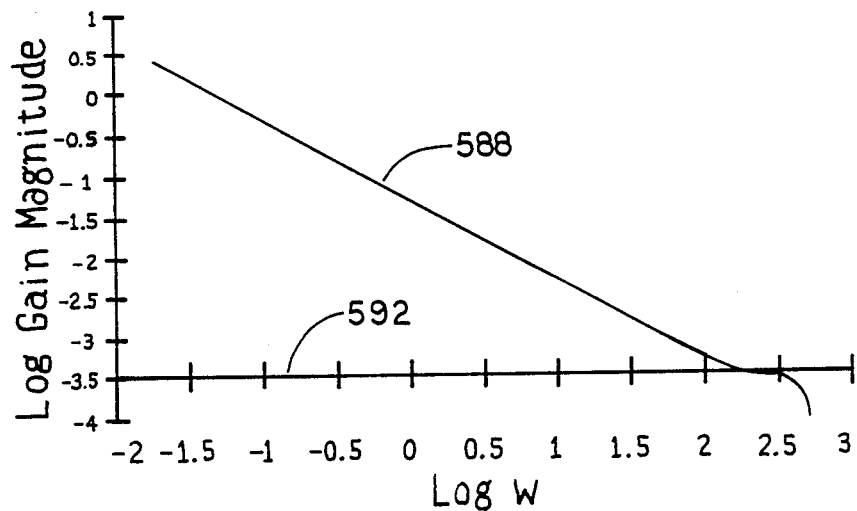
FIGS. 28A and 28B are Bode diagrams which illustrate the dynamic performance range of the open-loop control system of FIG. 27.
Figure 28B:
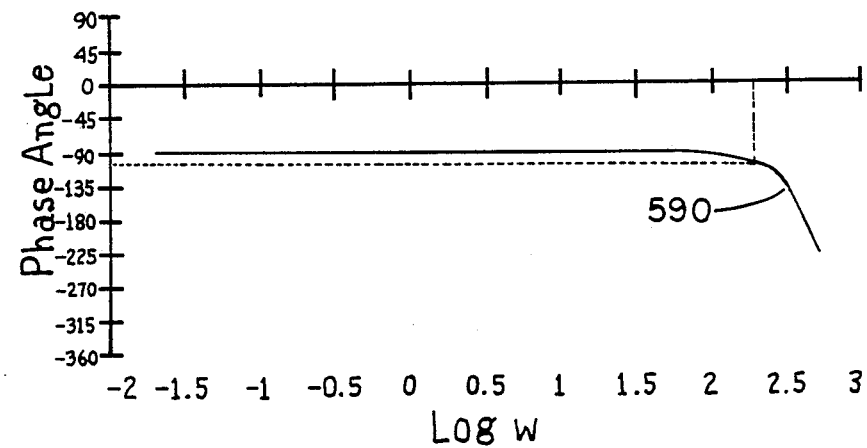

Shown in FIGS. 28A and 28B are Bode diagrams for the gain magnitude and phase angle, respectively, of this block transfer function (as evaluated by using the circuit values mentioned above). A curve 588 depicts the log of the magnitude of $X_m/F_v$ in FIG. 28A and a curve 590 depicts the concomitant phase angle in FIG. 28B.

Figure 29:
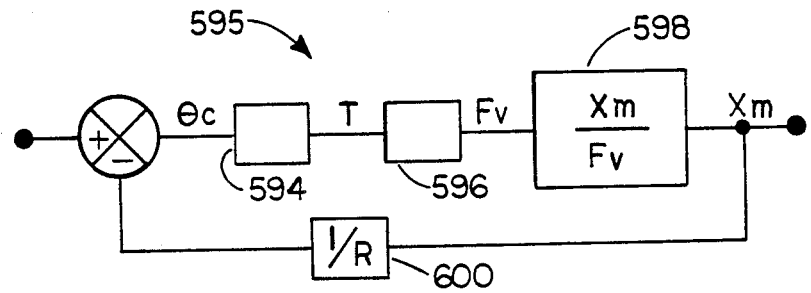
FIG. 29 is a block diagram which depicts a closed-loop servo system comprising the open-loop control system illustrated in FIG. 27.

The torsional stiffness of the torsion bar 213 determines the $\log(X_m/F_v)$ value of the abscissa 592. Shown in FIG. 29 is a simplified block diagram 595 for a closed-loop servo system comprising the closed-loop system described by the schematic circuit 560 and the mechanical features of the torque reaction valve 210. Comprised in a block 594 is the torsional stiffness value of 400(in.lb/rad.) selected for the torsion bar 213. (Thus, a maximum value of $\theta_e = 0.1$(rad.) results in T=40(in.lb).) The torque value is then divided by R=0.4(in.) in block 596 to determine a value for $F_v$. (Yielding a maximum value of $F_v=100$(lbs) which when divided by $A_v=0.1$(in.$^2$) results in a maximum value of P=1000(lb/in.$^2$). $X_m$ is determined via multiplication of $X_m/F_v$ in block 598 which block comprises the above defined block transfer function). $X_m$ is fed back via block 600 whose value is the inverse of the radius of the pinion 328, 1/R=1/0.333(in.). Finally, the $X_m/F_v$ value of the abscissa 592 is that value for the block 598 which will result in a loop gain of 1. This value is the inverse of the product of the values of the blocks 594, 596 and 600, or 0.000333(in./lb). Therefore, the abscissa 592 is plotted at $\log(0.000333) = -3.477$.

As explained hereinabove, the phase angle associated with unity gain cross-over (at point 602), determines the stability of the closed-loop servo system. This angle is shown (via following lines 604a and 604b) to be −106(deg.) in FIG. 28B. However, the nature of the curves 588 and 590 at frequencies slightly higher than that corresponding to unity gain cross-over (182(rad./sec.)=29.0(Hz)) suggests that slight changes in gain could lead to stability problems. This problem can easily be corrected by reducing the torsional stiffness of the torsion bar 213. However, that would concomitantly diminish the other performance parameters of the closed-loop servo system.

One might be tempted to change the value of R. Increasing the value of R would reduce the gain, but would also reduce circuit damping. If carried far enough, this would result in the curve 588 having a resonance characteristic resembling point 110a on the curve 104a shown in FIG. 11A. Reducing the value of R would increase the gain. In fact, if R is reduced to near zero values, $X_m/F_v$ becomes $A_p/MA_v s^2$ (which equals $(-1)(A/MA\ w)$) with a concomitant constant phase angle value of −180(deg.).

Another way to increase circuit damping is to introduce a "leak" across the primary of the transformer 582. The conductance of such a "leak" would obviously serve to dampen any oscillations of the parallel circuit comprising the mass 586, transformer 582 and capacitor 584. However, because it would be in series with the resistor 580, it would also reduce the maximum pressure available at the primary of the transformer 582 and the concomitant maximum force available to move the mass 586.

Figure 30:
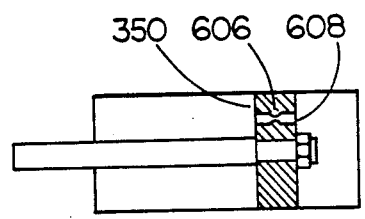
FIG. 30 is a sectional view of an orifice which is hydraulically in parallel with a piston of the double acting cylinder and which is used to improve the dynamic characteristics of the open-loop control system of FIG. 27.

On the other hand, if a system having more realistic load characteristics is assumed, a non-linear resistor, such as an orifice whose resistance is $R_b=(P_b)^{0.5}/100A_b$, may be utilized as the "leak". The increasing resistance, with respect to pressure, of such an orifice limits the loss of maximum force available to move the mass 586. For instance, consider a system having a load characterized by $$F = F_o + K_1 X_m + K_2 (dX_m/dt)$$

where F is a load force encountered by the mass 586 whenever it moves, $F_o$ is a coulomb (friction) force component of the load force, $K_1$ is a load spring constant (i.e., such as the restoring caster angle derived force encountered by a vehicular steering system), and $K_2$ is load damping constant (i.e., such as encountered by scrubbing soft rubber against an abrasive surface). The nature of such a load force permits an orifice 606 as shown in FIG. 30 to be utilized anywhere in parallel with the primary of the transformer 582. As shown in FIG. 30, one convenient location for mounting the orifice 606 is in a hole 608 formed in the piston 350.

Figure 31:
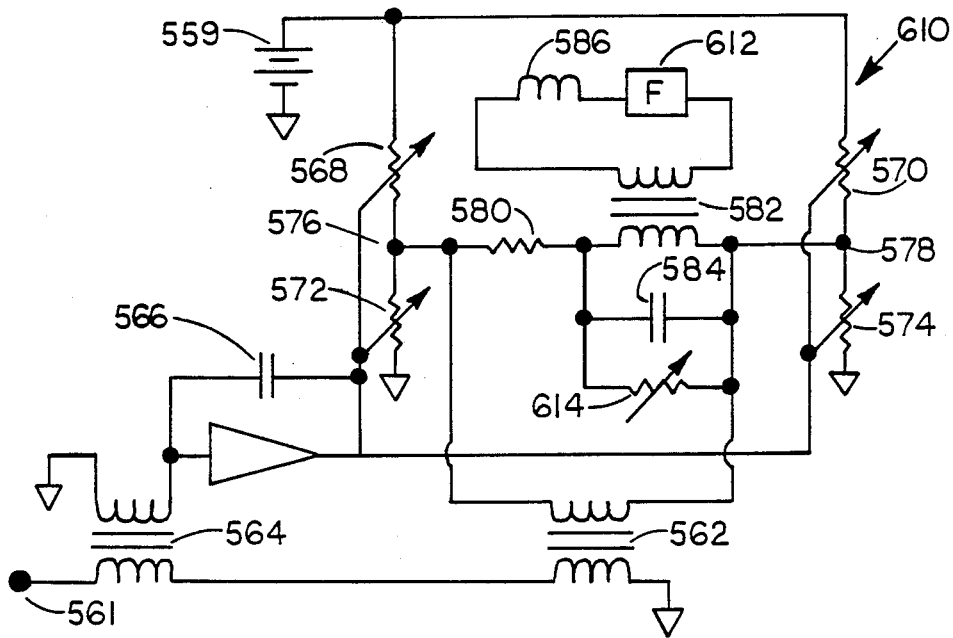
FIG. 31 is a schematic drawing of an enhanced open-loop control system which additionally comprises the orifice shown in FIG. 26 and a block representing a load placed upon the piston of the double acting cylinder.

Shown in FIG. 31 is a schematic circuit 610 which has been modified to include a block 612 comprising the load force F and a variable resistor 614 depicting the variable resistance of the orifice 606. The schematic circuit 610 is analyzed generally in the same manner as the schematic circuit 560. However, the pressure drop across the primary of the transformer 582 is now $(jwM/A_p)(dX_m/dt)+(F/A_p)$ and the flow rate through the capacitor 584 is now $(-1)(w^2MC/A_p)(dX_m/dt)+(-C/A_p)(dF/dt)$. The function (dF/dt) can be found via the equation $$dF/dt = K_1(dX_m/dt) + K_2(d^2 X_m/dt^2).$$

In addition, there is a parallel flow rate through the variable resistor 614 of $(jwM/R_b A_p)(dX_m/dt) + (F/R_b A_p)$.

Because of the $K_1 X_m$ term in the load force F, the system is no longer a so called type 1 system. That is, the denominator of a resulting block transfer function is no longer multiplied by the Laplace transform variable s to the first power. The practical result of this is that there will be a residual steady state error in $X_m$ and concomitant non-zero steady state values of F and P. For this reason, and for the reason that some persons skilled in the art may not be familiar with Laplace-transformations, the resulting equations for determining the gain magnitude and phase angle of a new block transfer function are presented as follows:

$$X_m/[F_v - ((R + R_b)A_v F_o/R_b A_p)] = (1/RA_p A_v)/$$
$$[(K_1(R + R_b)/RR_b A_p^2) - (((R + R_b)M/RR_b A_p^2) +$$
$$(K_2 C/A_p^2)) w^2 + jw(1 + (K_1 C/A_p^2) + (K_2(R + R_b A_p^2) -$$
$$(MCw^2/A_p^2))]$$

and $$\phi = -\tan^{-1}[1 + (K_1 C/A_p^2) + (K_2(R + R_b)/RR_b A_p^2) -$$
$$(MCw^2/A_p^2)]w/[(K_1(R + R_b)/RR_b A_p^2) -$$
$$(((R + R_b)M/RR_b A_p^2) - (K_2 C/A_p^2))w^2],$$

respectively.

Steady state values of these equations can be evaluated by setting w=O. When the relation T=0.4F is included, the following equations describe torque and phase angle as a function of $K_1$, R, $R_b$, $A_p$, $A_v$, $F_o$ and $X_m$ under steady state conditions:

$$T = 0.4[(R + R_b)A_v/R_b A_p](F_o + K_1 X_m) \text{ and}$$

$$\phi = 0 \text{(rad.), respectively.}$$

Figure 32:
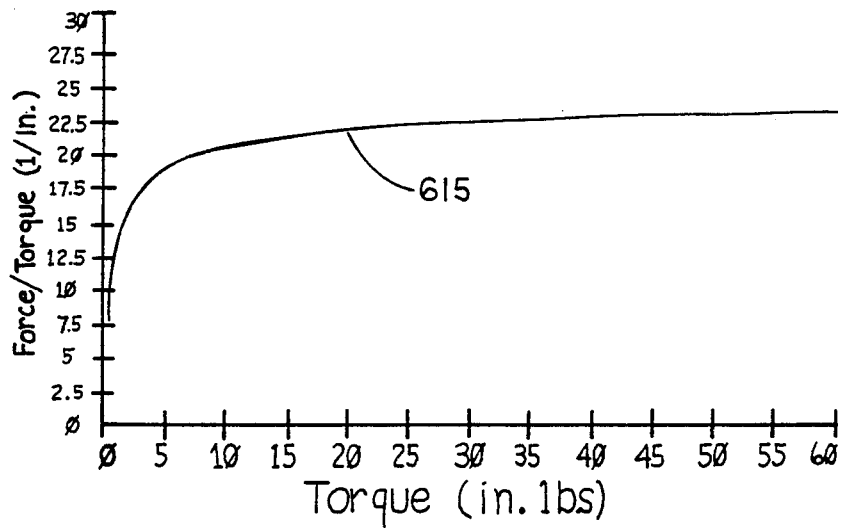
FIG. 32 is a graph illustrating output force/torque vs. torque for the open-loop control system of FIG. 31.

As mentioned above, most of the circuit values previously mentioned are used in evaluating the above equations, including $M=0.25$(lb.sec.$^2$/in.), $C=0.000025$(in.$^5$/lb), $A_p=1$(in.$^2$) and $A_v=0.1$(in.$^2$). However, $K_1$, $K_2$, R and $R_b$ may vary as a function of load conditions. Shown in FIG. 32 is a curve 615 which depicts output force/torque vs. torque for $K_1=100$(lb/in.), $R=200$(lb.sec./in.$^5$) and $R_b=63.25(F/A_p^2)^{0.5}$(lb.sec./in.$^5$) where the output force, F, equals the sum, $F_o+K_1X_m$.

(This value for $R_b$ requires an orifice sized via the following procedure:

$$R = (1/A_p^2)(dF/dQ_b) = [d(Q_b^2/10000A_b^2)/dQ_b =$$

$$[Q_b/5000A_b^2] = [100A_b(F/A_p^2)^{.5}/5000A_b^2],$$

thus $63.25\,(F/A_p^2)^{.5} = (.02/A_b)\,(F/A_p^2)^{.5}$, or $A_b = (.02/63.25) = .000316$(in.$^2$), and $d_b = .0226$(in.)

where $d_b$ is the diameter of the orifice 606.)

Comparing the curve 615 with the curve 69 of FIG. 8 illustrates a strong application advantage for power steering systems comprising the present invention. Output force very nearly approximates proportionality with steering wheel torque. Yet, lower values concomitant with very low values of torque preclude over-sensitive response to small involuntary steering wheel inputs.

Figure 33A:
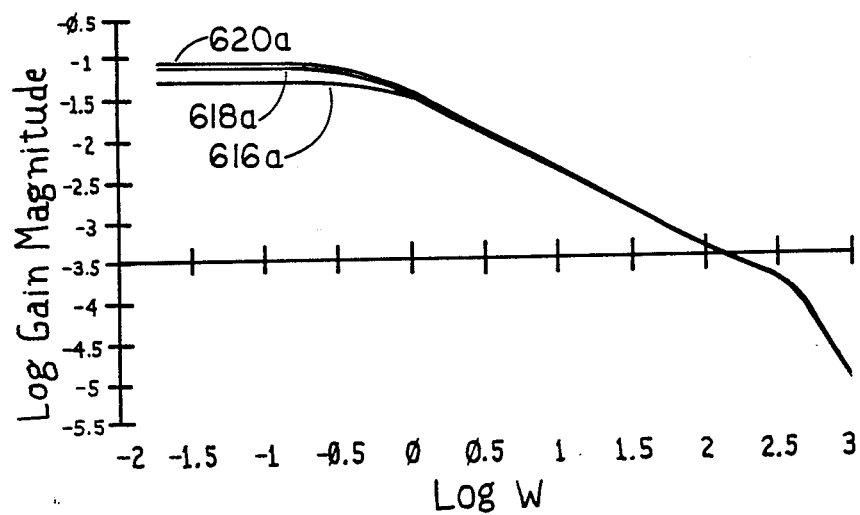
FIGS. 33A and 33B are Bode diagrams which illustrate the dynamic performance range of the open-loop control system of FIG. 31 for output forces of 10(lbs), 100(lbs), and 1000(lbs).
Figure 33B:
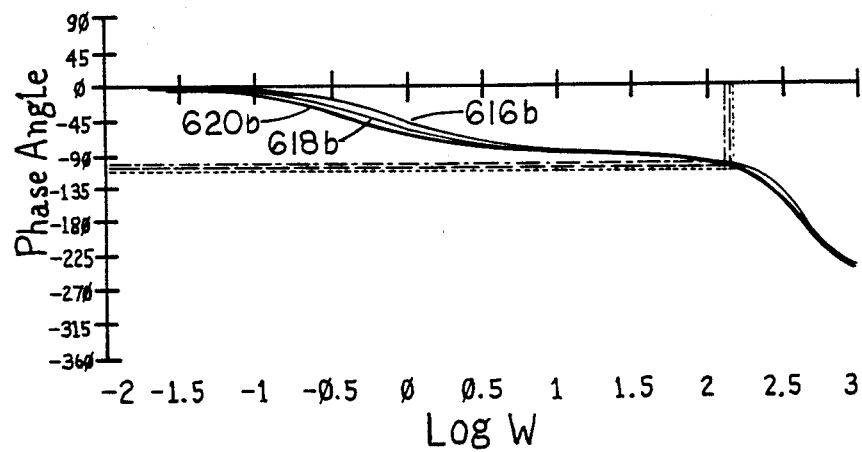

Shown in FIGS. 33A and 33B are Bode diagrams for the gain magnitude and phase angle, respectively, of the new block transfer function for the following assumed values for $K_1$, $K_2$, R and $R_b$ which correspond to $F=10$(lbs), 100(lbs) and 1000(lbs) and near zero values of $dX_m/dt$: $K_1=100$(lbs/in.); $K_2=10$(lb.sec./in.), 20(lb.sec./in.) and 40(lb.sec./in.), respectively; $R=200$(lb.sec./in.$^5$); and $R_b=200$(lb.sec./in.$^5$), 632.5(lb.sec./in.$^5$) and 2000(lb.sec./in.$^5$), respectively. In FIGS. 33A and 33B, curves 616a and 616b, 618a and 618b, and 620a and 620b correspond to F=10(lbs), 100(lbs) and 1000(lbs), respectively.

Figure 34A:
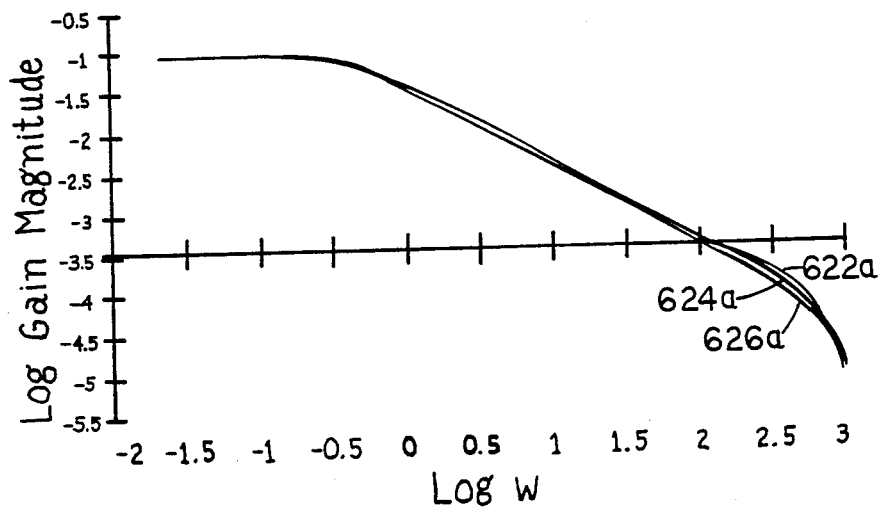
FIGS. 34A and 34B are Bode diagrams which illustrate the dynamic performance range of the open-loop control system of FIG. 31 for velocities of 0(in./sec.), 1(in./sec.), and 4(in./sec.) and an output force of 1000(lbs).
Figure 34B:
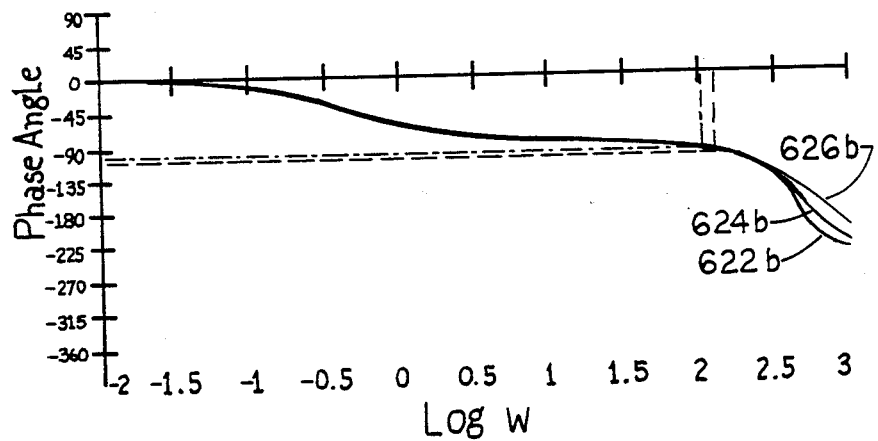

Shown in FIGS. 34A and 34B are Bode diagrams for the gain magnitude and phase angle, respectively, of the new block transfer function for the following assumed values for $K_1$, $K_2$, R and $R_b$ corresponding to $F=1000$(lbs) and $dX_m/dt=0$(in./sec.), 1(in./sec.) and 4(in./sec.): $K_1=100$(lbs/in.); $K_2=40$(lb.sec./in.), 80(lb.sec./in.) and 160(lb.sec./in.), respectively; $R=200$(lb.sec./in.$^5$), 150(lb.sec./in.$^5$) and 100(lb.sec./in.$^5$), respectively; and $R_b=2000$(lb.sec./in.$^5$). In FIGS. 34A and 34B curves 622a and 622b, 624a and 624b, and 626a and 626b correspond to $dX_m/dt=0$(in./sec.), 1(in./sec) and 4(in./sec.), respectively.

All of the curves shown in FIGS. 33A, 33B, 34A and 34B depict stable operation with very acceptable phase angles and margins of error. They compare most favorably with any of the curves shown in any of FIGS. 11A, 11B, 13A, 13B, 16A and 16B.

Figure 35:
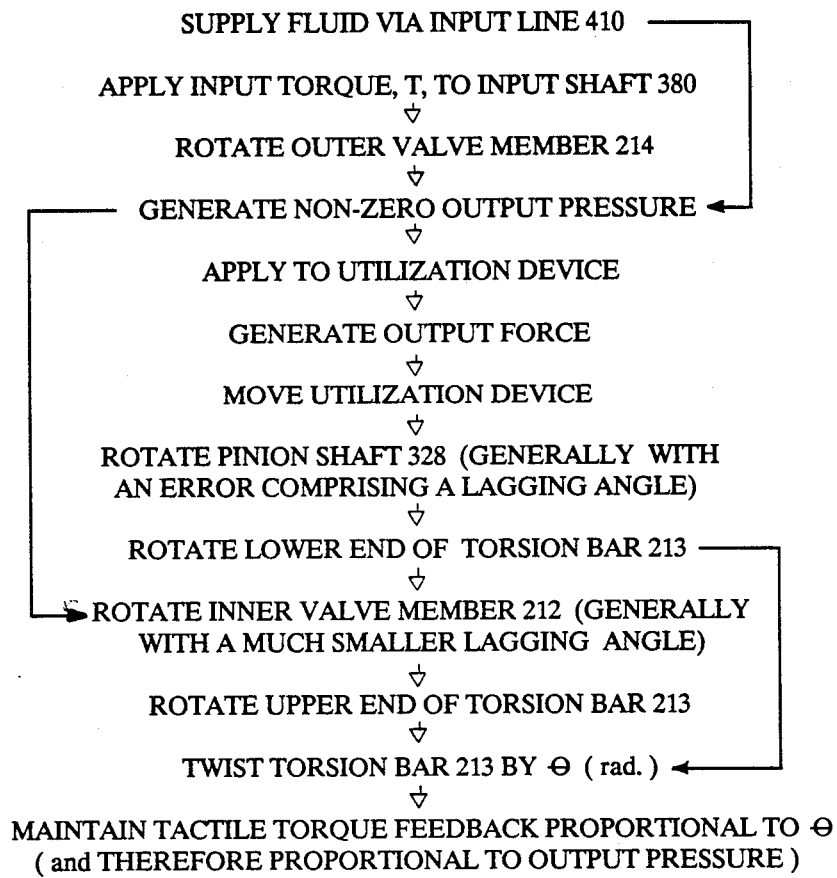
FIG. 35 is a flow chart outlining a method of controlling a closed-loop servo system comprising a torque reaction valve.

FIG. 35 is a flow chart that outlines the procedure followed in controlling a closed-loop servo system comprising a torque reaction valve 210. Fluid is supplied to the torque reaction valve 210 via input line 410. Torque is applied to input shaft 380 which causes outer valve member 214 to rotate. Non-zero output pressure is generated and applied to a utilization device. The utilization device generates an output force which (in general) results in movement of the utilization device. The movement of the utilization device causes counter-rotation of pinion shaft 328 and the lower end of torsion bar 213. The output pressure also causes inner valve member 212 to rotate — which cause rotation of the upper end of the torsion bar 213. Combined counter-rotation of its lower end and rotation of its upper end causes the torsion bar 213 to twist by $\theta_e$. The twisting of the torsion bar 213 maintains tactile torque feedback (to the input shaft 380) which is proportional to $\theta_e$ (and therefore proportional to the output pressure).

Figure 36:
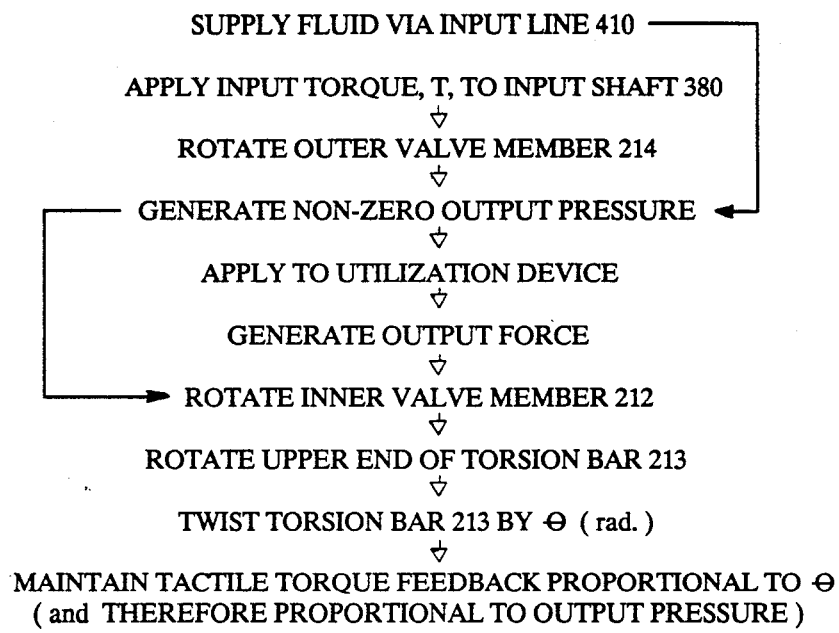
FIG. 36 is a flow chart outlining a method of controlling an open-loop servo system comprising a hand operated controller.

FIG. 36 is a flow chart that outlines the procedure followed in controlling an open-loop servo system comprising a differential pressure controller 450. Fluid is supplied to the differential pressure controller 450 via input line 410. Torque is applied to input shaft 380 which causes outer valve member 214 to rotate. Non-zero output pressure is generated and applied to a utilization device. The utilization device generates an output force. The output pressure also causes inner valve member 212 to rotate — which causes rotation of the upper end of the torsion bar 213. The rotation of its upper end causes the torsion bar 213 to twist by $\theta_e$. The twisting of the torsion bar 213 maintains tactile torque feedback (to the input shaft 380) which is proportional to $\theta_e$ (and therefore proportional to the output pressure).

Figure 37:
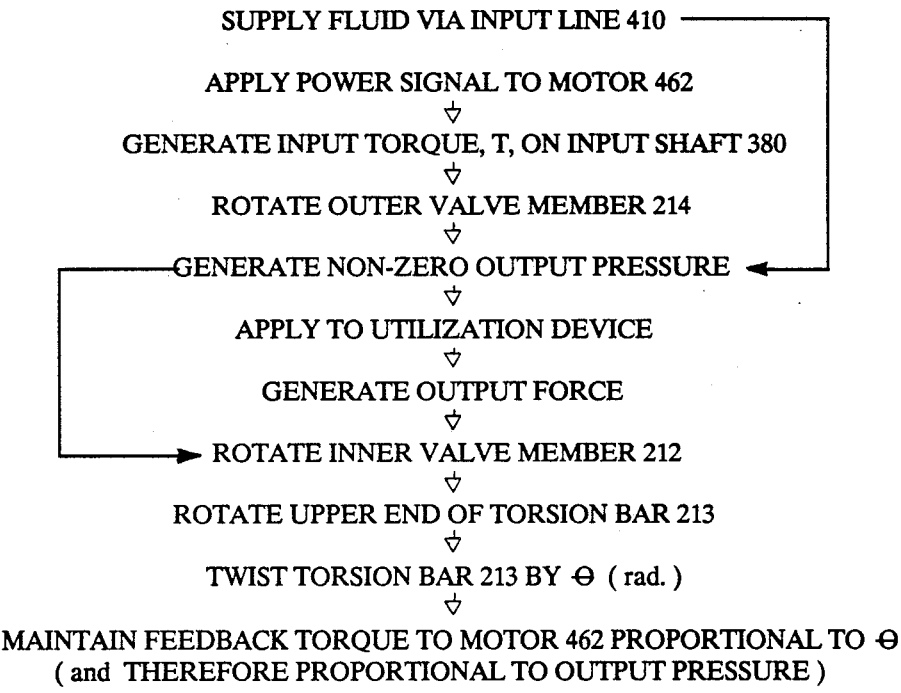
FIG. 37 is a flow chart outlining a method of controlling a closed-loop or open-loop servo system comprising an electro-hydraulic servo valve.

FIG. 37 is a flow chart that outlines the procedure followed in controlling a servo system (either open- or closed-loop) comprising an electro-hydraulic servo valve 460. Fluid is supplied to the electro-hydraulic servo valve 460 via input line 410. A power signal is applied to motor 462 which exerts torque on input shaft 380. This causes outer valve member 214 to rotate. Non-zero output pressure is generated and applied to a utilization device. The utilization device generates an output force. The output pressure also causes inner valve member 212 to rotate — which causes rotation of the upper end of the torsion bar 213. The rotation of its upper end causes the torsion bar 213 to twist by $\theta_e$. The twisting of the torsion bar 213 maintains feedback torque to the motor 462 (via the input shaft 380) which is proportional to $\theta_e$ (and therefore proportional to the output pressure).

I claim:

1. An open-center four-way valve for controlling a double-acting utilization device, the valve having outer and inner valve members wherein:
   the outer valve member has identical pluralities of axially oriented internal inlet and return slots wherebetween first and second output zones are alternately disposed,
   the inner valve member has identical pluralities of external input and return ridges each disposed in radial juxtaposition to one of the input or return slots of the outer valve member, respectively,
   a peripheral surface defining the radial extent of each input ridge is tangentially narrower than an exit mouth of its respective juxtaposed input slot — thus forming first and second sets of axially disposed input orifices for metering incoming fluid flow between the input slots and the first and second output zones, respectively,
   a peripheral surface defining the radial extent of each return ridge is tangentially narrower than an entrance mouth of its respective juxtaposed return slot — thus forming first and second sets of axially disposed return orifices for metering returning fluid flow between the first and second output zones, respectively, and the return slots, peripheral surfaces of the input and return ridges are formed at slightly smaller radii than male corner edges defining the input and return slots, respectively, the inner and outer valve members are mechanically adapted for relative tangential motion therebetween, and the male corner edges defining the return slot entrance mouths are formed at larger radii than the male corner edges defining the inlet slot exit mouths, whereby differential pressure values present in the first and second output zones are enabled to generate torque reaction values in a feedback manner.

2. An open-center four-way valve for controlling a double-acting utilization device, the valve having outer and inner valve members wherein:

the outer valve member has identical pluralities of axially oriented internal inlet and return slots wherebetween first and second output zones are alternately disposed, the inner valve member has identical pluralities of external input and return ridges each disposed in radial juxtaposition to one of the input or return slots of the outer valve member, respectively, each input ridge extends radially within and is tangentially narrower than an exit mouth of its respective juxtaposed input slot — thus forming first and second sets of axially disposed input orifices, which are formed between male corner edges defining the exit mouths and side walls of the input ridges, for metering incoming fluid flow between the input slots and the first and second output zones, respectively, each return ridge extends radially within and is tangentially narrower than an entrance mouth of its respective juxtaposed return slot — thus forming first and second sets of axially disposed return orifices, which are formed between male corner edges defining the radial extent of each return ridge wall and side walls of the return slots, for metering returning fluid flow between the first and second output zones, respectively, and the return slots, the inner and outer valve members are mechanically adapted for relative tangential motion therebetween, and the male corner edges partially defining the return slot orifices are formed at larger radii than the male corner edges partially defining the inlet orifices, whereby differential pressure values present in the first and second output zones are enabled to generate torque reaction values in a feedback manner.

3. A valve having first and second valve members adapted for rotation therebetween, said first valve member having pressure and return slots with lateral edges formed in first and second configurations, respectively, and said second valve member having first and second lands with lateral edges formed in third and fourth configurations, respectively, such that a nonzero output pressure generates a significant torque between said first and second valve members.

4. A valve in accordance with claim 3 wherein said first and third lateral edge configurations comprise shoulders having surfaces which are cylindrically formed at a first nominal radial dimension but have minimal radial clearance therebetween, and said second and fourth lateral edge configurations comprise shoulders having surfaces which are cylindrically formed at a second nominal radial dimension but have minimal radial clearance therebetween.

5. A valve in accordance with claim 4 wherein said first and third lateral edge configurations form input control orifices and said second and fourth lateral edge configurations form return control orifices.

6. A valve in accordance with claim 5 wherein said lateral edge configurations are formed such that either, or both, of said input control orifices and said return control orifices are open when said second valve member is tangentially centered with respect to said first valve member.

7. A valve in accordance with claim 3 wherein said first and third lateral edge configurations are formed in a tangentially juxaposed manner such that gaps therebetween become progressively narrower with respect to fluid flow direction and said second and fourth lateral edge configurations are also formed in a tangentially juxaposed manner such that gaps therebetween become progressively narrower with respect to fluid flow direction thereby forming input and return control orifices, respectively, at first and second nominal radial dimensions, respectively.

8. A valve in accordance with claim 7 wherein said lateral edge configurations are formed such that said input and return control orifices are open when said second valve member is tangentially centered with respect to said first valve member.

9. A valve in accordance with claim 6 wherein N sets of said input, output and return ports, said pressure and return slots and said first and second lands are arranged in a balanced manner for eliminating radial forces between said first and second valve members.

10. A valve in accordance with claim 9 wherein $N=4$.

11. A valve in accordance with claim 10 wherein said first valve member is an outer valve member, said second valve member is an inner valve member and said second nominal radial dimension is larger than said first nominal radial dimension.

12. A valve in accordance with claim 11 wherein said input and output ports are located in said outer valve member and said return ports are located in said inner valve member.

13. A valve in accordance with claim 9 in combination with a nominally constant flow fluid source and means for applying input torque to an input one of said first and second valve members.

14. A combination in accordance with claim 13 wherein said input one of said first and second valve members is said outer valve member.

15. A combination in accordance with claim 13 also including torsional spring means wherein said torsional spring means applies torque and position feedback to the other one of said first and second valve members.

16. A combination in accordance with claim 15 wherein said torsional spring means comprises a torsion bar.

17. A combination in accordance with claim 16 wherein either end of said torsion bar is slidably connected to an object used for positional reference in providing said torque and position feedback and/or to said other one of said first and second valve members.

18. A combination in accordance with claim 17 wherein said either end of said torsion bar includes a male spline having a number of teeth equal to an integral multiple of N.

19. A combination in accordance with claim 15 wherein said output ports are hydraulically coupled to a double-acting utilization device for driving an output member thereof, said output member being coupled to said torsional spring means for providing said torque and position feedback thereby configuring a closed-loop servo system.

20. A combination in accordance with claim 19 wherein said output member also drives a utilization mass.

21. A combination in accordance with claim 20 wherein said first and second valve members of said valve are housed in a valve body and said first and second valve members, said torsional spring means, said double-acting utilization device and said output member are secured in position by, or with respect to, said valve body.

22. A combination in accordance with claim 21 also including controlled orifice flow restrictions, said output ports of said valve being connected to either side of said double acting utilization device via said restrictions.

23. A combination in accordance with claim 22 wherein said double-acting utilization device comprises a double-acting hydraulic cylinder.

24. A combination in accordance with claim 23 wherein said output member comprises a rack and means utilized for coupling said torsional spring means to said output member comprise a pinion.

25. A combination in accordance with claim 24 further comprising tangentially loose fitting spline means for mechanically coupling said input one of said first and second valve members to said pinion via rotational overtravel enabled by untoward hydraulic system failure, thus providing emergency position drive to said utilization mass via said rack.

26. A torque reaction valve, said valve including first and second members, said first member including pressure and return slots having lateral edges, said second member including first and second lands also having lateral edges, said lateral edges of said slots and said lands being formed with respect to one another to generate reaction torque within the valve itself.

* * * * *

UNITED STATES PATENT AND TRADEMARK OFFICE
CERTIFICATE OF CORRECTION

PATENT NO. : 4,922,803

DATED : May 8, 1990

INVENTOR(S) : Edward H. Phillips

It is certified that error appears in the above-identified patent and that said Letters Patent is hereby corrected as shown below:

ON SHEET 3 OF 25 OF THE DRAWING SHEETS, "FIG. 4A" (second occurrence) should be --FIG. 4B--.

Column 2, line 33, "diagramatic" should be --diagrammatic--.

Column 5, line 6, "digramatic" should be --diagrammatic--.

Column 7, line 1, "diagramatic" should be --diagrammatic--.

Column 8, line 7, "(in.$_5$/lb.sec.)" should be --(in.$^5$/lb.sec.)--.

Column 8, line 38, "dipicts" should be --depicts--.

Column 10, line 64, "d x b/dt" should be --$dx_b/dt$--.

Column 11, line 29, "(5000MA$^2_{2o}$/QA$_p^2$)s" should be --(5000MA$_{2o}^2$/QA$_p^2$)s--.

Column 11, line 46, "respectively," should be --respectively),--.

Column 13, line 38, before "another", delete "an".

Column 14, line 36, after "are", delete "in".

Column 15, line 53, "counterbore" should be --counterbores--.

Column 16, line 21, "treadably" should be --threadably--.

UNITED STATES PATENT AND TRADEMARK OFFICE
CERTIFICATE OF CORRECTION

PATENT NO. : 4,922,803

DATED : May 8, 1990

INVENTOR(S) : Edward H. Phillips

It is certified that error appears in the above-identified patent and that said Letters Patent is hereby corrected as shown below:

Column 16, line 36, "treaded" should be --threaded--.

Column 19, line 63, "accomodate" should be --accommodate--.

Column 24, line 49, "$(K_2(R + R_bA_p^2)$" should be --$(K_2(R + R_b)/RR_bA_p^2)$--.

Column 25, line 14, "R" should be --$R_b$--.

Column 25, line 14, "$[d(Q_b^2/10000A_b^2)/dQ_b$" should be --$[d(Q_b^2/10000A_b^2)/dQ_b]$--.

Column 28, line 18, claim 7, "juxaposed" should be --juxtaposed--.

Column 28, line 22, claim 7, "juxaposed" should be --juxtaposed--.

Signed and Sealed this

Fourth Day of May, 1993

*Attest:*

MICHAEL K. KIRK

*Attesting Officer*  *Acting Commissioner of Patents and Trademarks*